US012750852B2

(12) United States Patent
Tian et al.

(10) Patent No.: US 12,750,852 B2
(45) Date of Patent: Sep. 29, 2026

(54) PHYSICAL UPLINK CONTROL CHANNEL (PUCCH) RESOURCE SET FOR MULTIPLE RESOURCE BLOCK PUCCH TRANSMISSION

(71) Applicant: QUALCOMM Incorporated, San Diego, CA (US)

(72) Inventors: Qingjiang Tian, San Diego, CA (US); Jing Sun, San Diego, CA (US); Xiaoxia Zhang, San Diego, CA (US); Zhifei Fan, San Diego, CA (US); Wooseok Nam, San Diego, CA (US); Ahmed Abdelaziz Ibrahim Abdelaziz Zewail, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 653 days.

(21) Appl. No.: 17/663,207

(22) Filed: May 12, 2022

(65) Prior Publication Data

US 2022/0386299 A1 Dec. 1, 2022

Related U.S. Application Data

(60) Provisional application No. 63/250,974, filed on Sep. 30, 2021, provisional application No. 63/242,444,
(Continued)

(51) Int. Cl.
*H04W 72/23* (2023.01)
*H04L 5/00* (2006.01)
(Continued)

(52) U.S. Cl.
CPC ......... *H04W 72/21* (2023.01); *H04W 72/044* (2013.01); *H04W 72/1268* (2013.01); *H04W 72/23* (2023.01)

(58) Field of Classification Search
CPC ............... H04W 72/21; H04W 72/044; H04W 72/1268; H04W 72/23; H04L 5/0007;
(Continued)

(56) References Cited

U.S. PATENT DOCUMENTS 11,218,996 B2 1/2022 Wang et al.
12,273,890 B2 * 4/2025 Wang ................ H04W 72/1268
(Continued)

FOREIGN PATENT DOCUMENTS

CN 114765867 A * 7/2022 ........... H04W 72/23
WO 2019195180 A1 10/2019
WO 2020033897 A1 2/2020

OTHER PUBLICATIONS

International Search Report and Written Opinion—PCT/US2022/072316—ISA/EPO—Sep. 2, 2022.
(Continued)

*Primary Examiner* — Derrick W Ferris
*Assistant Examiner* — M Mostazir Rahman
(74) *Attorney, Agent, or Firm* — Patterson & Sheridan LLP

(57) ABSTRACT

Certain aspects of the present disclosure provide techniques for a physical uplink control channel (PUCCH) resource set for a multiple resource block (RB) PUCCH transmission. A method that may be performed by a user equipment (UE) includes receiving information indicating a PUCCH resource set and a number of RBs parameter and receiving downlink control information (DCI) containing a PUCCH resource indicator (PRI). The method generally includes determining a PUCCH resource from the PICCH resource set and transmitting the PUCCH transmission using the PUCCH resource.

25 Claims, 19 Drawing Sheets

Related U.S. Application Data filed on Sep. 9, 2021, provisional application No. 63/192,498, filed on May 24, 2021.

(51) Int. Cl.

*H04W 72/044* (2023.01)
*H04W 72/1268* (2023.01)
*H04W 72/21* (2023.01)

(58) Field of Classification Search

CPC ..... H04L 5/001; H04L 5/0048; H04L 5/0051; H04L 5/0053; H04L 5/0094

See application file for complete search history.

(56) References Cited

U.S. PATENT DOCUMENTS

2019/0297618 A1* 9/2019 Yang ..................... H04L 5/0094
2021/0029731 A1* 1/2021 Kundu ................ H04W 74/004
2021/0152211 A1 5/2021 Matsumura et al.
2021/0297314 A1 9/2021 Stefanatos et al.
2023/0319827 A1* 10/2023 Myung ................. H04L 5/0053 370/329

OTHER PUBLICATIONS

NTT DOCOMO, Inc., "PUCCH Format 0/1/4 Enhancements for NR from 52.6 to 71 GHz", 3GPP TSG RAN WG1 Meeting #105-e, R1-2105689, 3rd Generation Partnership Project (3GPP), Mobile Competence Centre, 650, Route Des Lucioles, F-06921 Sophia-Antipolis Cedex, France, vol. RAN WG1, No. E1ectronic Meeting, May 10, 2021-May 27, 2021, May 12, 2021 (May 12, 2021), XP052011640, 11 Pages, R1-2105689 PUCCH Enhancements for NR from 52 to 71 GHz.docx, Section 2.3.

Qualcomm Incorporated: "Enhancement for PUCCH Format 0/1/4 for NR Operations in Unlicensed 60GHz Band", 3GPP TSG-RAN WG1 #105e, R1-2104660, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 12, 2021 (May 12, 2021), XP052010911, 8 Pages, R1-2104660_8.2.3_PUCCH_format_0_1_enhancement_60GHz-105e.docx.

* cited by examiner

400

| Index | PUCCH format | First symbol | Number of symbols | PRB offset | Set of initial CS indexes |
|---|---|---|---|---|---|
| 0 | 0 | 12 | 2 | 0 | {0,3} |
| 1 | 0 | 12 | 2 | 0 | {0,4,8} |
| 2 | 0 | 12 | 2 | 3 | {0,4,8} |
| 3 | 1 | 10 | 4 | 0 | {0,6} |
| 4 | 1 | 10 | 4 | 0 | {0,3, 6, 9} |
| 5 | 1 | 10 | 4 | 2 | {0,3, 6, 9} |
| 6 | 1 | 10 | 4 | 4 | {0,3, 6, 9} |
| 7 | 1 | 4 | 10 | 0 | {0,6} |
| 8 | 1 | 4 | 10 | 0 | {0,3, 6, 9} |
| 9 | 1 | 4 | 10 | 2 | {0,3, 6, 9} |
| 10 | 1 | 4 | 10 | 4 | {0,3, 6, 9} |
| 11 | 1 | 0 | 14 | 0 | {0,6} |
| 12 | 1 | 0 | 14 | 0 | {0,3, 6, 9} |
| 13 | 1 | 0 | 14 | 2 | {0,3, 6, 9} |
| 14 | 1 | 0 | 14 | 4 | {0,3, 6, 9} |
| 15 | 1 | 0 | 14 | [N_sizeBWP / 4] | {0,3, 6, 9} |

*FIG. 4*

PHYSICAL UPLINK CONTROL CHANNEL (PUCCH) RESOURCE SET FOR MULTIPLE RESOURCE BLOCK PUCCH TRANSMISSION

CROSS-REFERENCE TO RELATED APPLICATION(S)

This application claims benefit of and priority to U.S. Provisional Application No. 63/192,498, filed May 24, 2021, U.S. Provisional Application No. 63/242,444, filed Sep. 9, 2021, and U.S. Provisional Application No. 63/250,974, filed Sep. 30, 2021, which are each hereby assigned to the assignee hereof and hereby expressly incorporated by reference herein in their entireties as if fully set forth below and for all applicable purposes.

INTRODUCTION

Aspects of the present disclosure relate to wireless communications, and more particularly, to techniques for a physical uplink control channel (PUCCH) resource set for multiple resource block (RB) PUCCH transmission.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few.

These and other multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects of the subject matter described in this disclosure can be implemented in a method for wireless communication by a user equipment (UE). The method generally includes receiving information indicating a PUCCH resource set and a number of RBs parameter. The method generally includes receiving downlink control information (DCI) in a physical downlink control channel (PDCCH). The DCI contains a PUCCH resource indicator (PRI). The method generally includes determining a PUCCH resource from the PUCCH resource set for a PUCCH transmission. Determining the PUCCH resource set from the resource set for the PUCCH transmission generally includes determining a PUCCH resource index based, at least in part, on the PRI; determining a lowest RB index for the PUCCH transmission based, at least in part on the PUCCH resource index and the number of RBs parameter; and determining an initial cyclic shift (CS) for the PUCCH transmission based, at least in part, on the PUCCH resource index and the number of RBs parameter. The method generally includes transmitting the PUCCH transmission using the PUCCH resource.

Certain aspects of the subject matter described in this disclosure can be implemented in a method for wireless communication by a network entity. The method generally outputting information indicating a PUCCH resource set and a number of RBs parameter. The method generally includes outputting DCI. The DCI contains a PRI. The method generally includes determining a PUCCH resource from the PUCCH resource set for a PUCCH transmission. Determining the PUCCH resource from the PUCCH resource set for the PUCCH transmission generally includes determining a PUCCH resource index based, at least in part, on the PRI; determining a lowest RB index for the PUCCH transmission based, at least in part on the PUCCH resource index and the number of RBs parameter; and determining an initial CS for the PUCCH transmission based, at least in part, on the PUCCH resource index and the number of RBs parameter. The method generally includes monitoring the PUCCH transmission using the PUCCH resource.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

FIG. 4 is a table illustrating example PUCCH resource sets, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for a PUCCH resource set for multi-RB PUCCH transmission.

Figure 1:
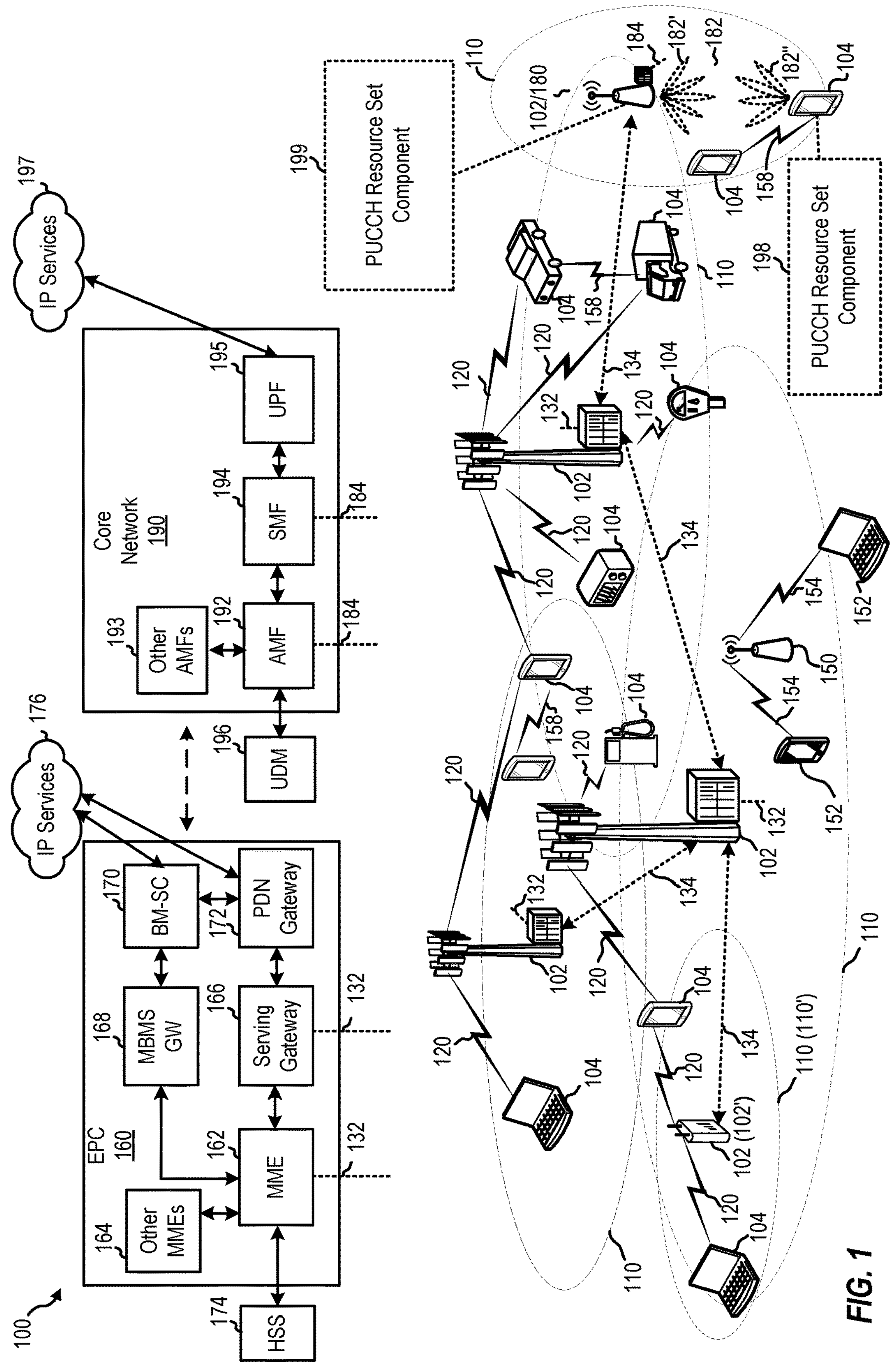
FIG. 1 is a block diagram conceptually illustrating an example wireless communication network, in accordance with certain aspects of the present disclosure.

FIG. 1 depicts an example of a wireless communications network 100, in which aspects described herein may be implemented. The wireless communication network 100 may be a new radio (NR) network (e.g., a 5G NR network).

Generally, wireless communications network 100 includes base stations (BSs) 102, user equipments (UEs) 104, an Evolved Packet Core (EPC) 160, and core network 190 (e.g., a 5G Core (5GC)), which interoperate to provide wireless communications services.

BSs 102 may provide an access point to the EPC 160 and/or to the core network 190 for a user equipment 104. The BSs 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a next generation Node B (gNB), a Node B, an evolved Node B (eNB), an access point (AP), a base transceiver station (BTS), a radio base station, a radio transceiver, a transceiver function, or a transmit reception point (TRP) in various contexts.

BSs 102 wirelessly communicate with UEs 104 via communications links 120. Each of the BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS102 and/or downlink (DL) (also referred to as forward link) transmissions from a BS 102 to a UE 104. The communication links 120 may use multiple-input multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal (MT), a wireless terminal, a remote terminal, a handset, a user agent, a mobile client, or a client.

According to certain aspects, the BSs 102 and UEs 104 may be configured for a PUCCH resource set for multiple resource block PUCCH transmission. As shown in FIG. 1, the BS 102 includes a PUCCH resource set component 199 that may be configured to determine a PUCCH resource from a PUCCH resource set for multi-RB PUCCH transmission, in accordance with aspects of the present disclosure. The UE **120*a* includes a PUCCH resource set component 198** that may be configured to determine a PUCCH resource from a PUCCH resource set for multi-RB PUCCH transmission, in accordance with aspects of the present disclosure.

Figure 2:
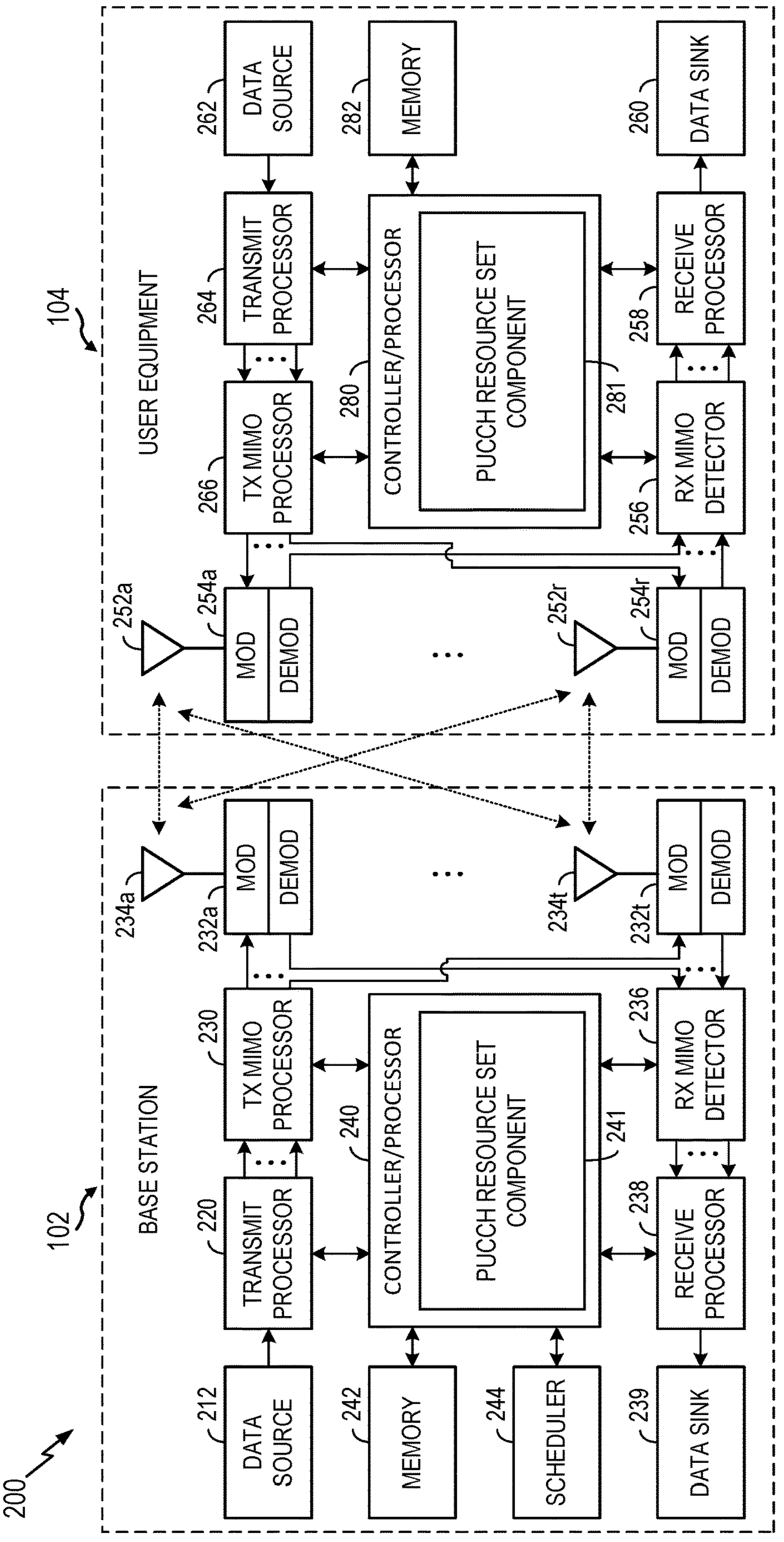
FIG. 2 is a block diagram conceptually illustrating aspects of an example base station (BS) and user equipment (UE), in accordance with certain aspects of the present disclosure.

FIG. 2 depicts aspects of an example BS 102 and UE 104.

Generally, BS 102 includes various processors (e.g., 220, 230, 238, and 240), antennas 234*a-t* (collectively 234), transceivers 232*a-t* (collectively 232) which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes PUCCH resource set component 241, which may be representative of PUCCH resource set component 199 of FIG. 1. Notably, while depicted as an aspect of controller/processor 240, PUCCH resource set component 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes PUCCH resource set component 281, which may be representative of PUCCH resource set component 198 of FIG. 1. Notably, while depicted as an aspect of controller/processor 280, PUCCH resource set component 281 may be implemented additionally or alternatively in various other aspects of user equipment 104 in other implementations.

Figure 3B:
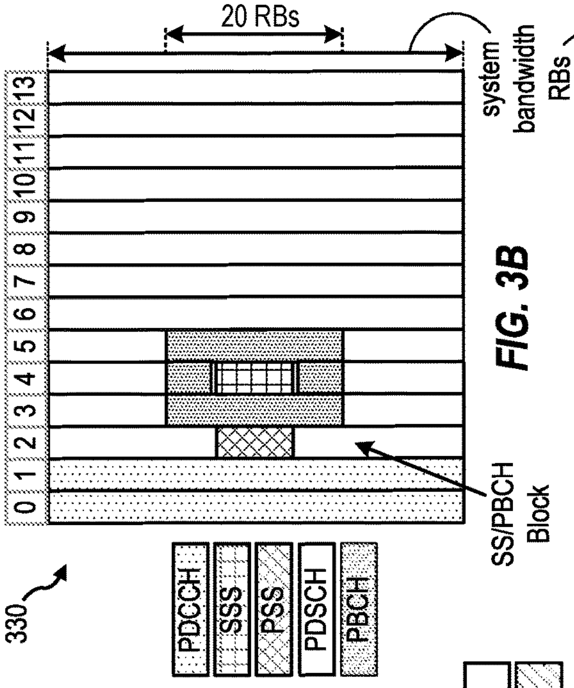
FIGS. 3A-3D depict various example aspects of structures for a wireless communication network, in accordance with certain aspects of the present disclosure.
Figure 3D:
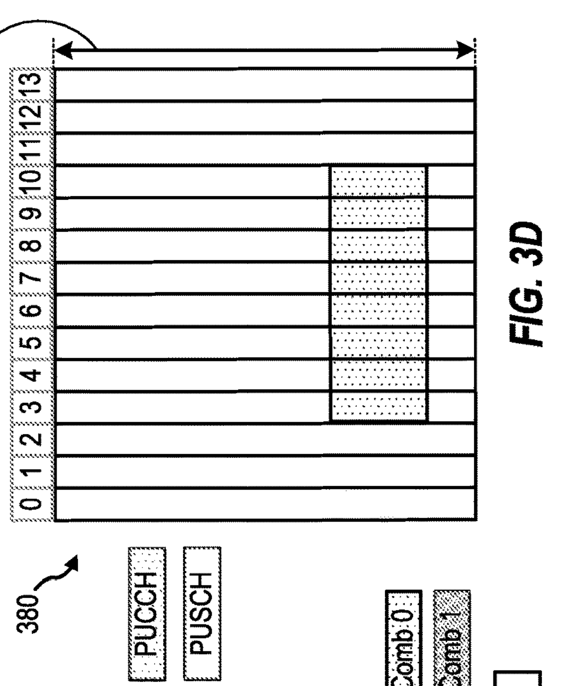
Figure 3A:
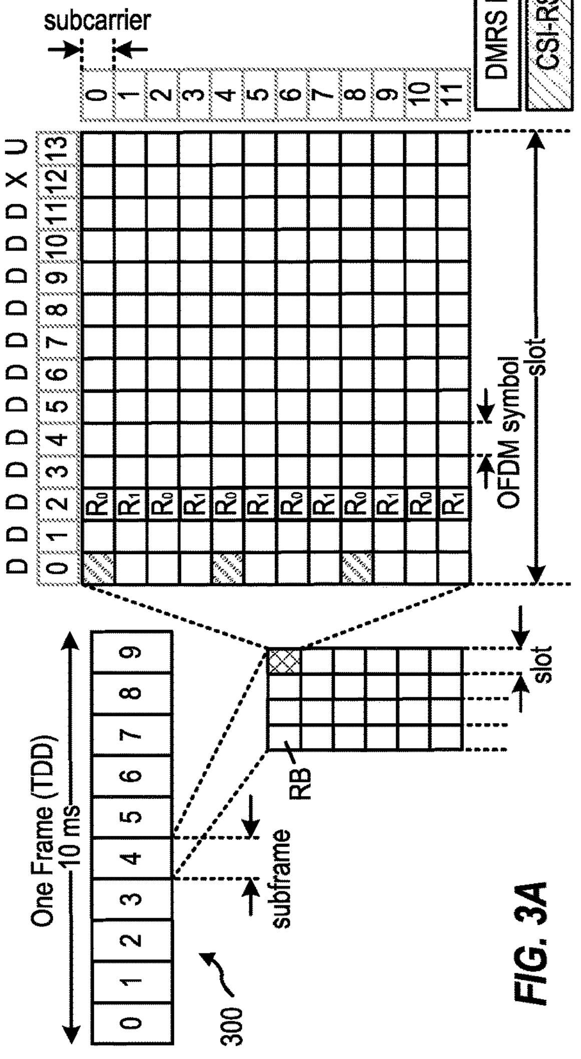
Figure 3C:
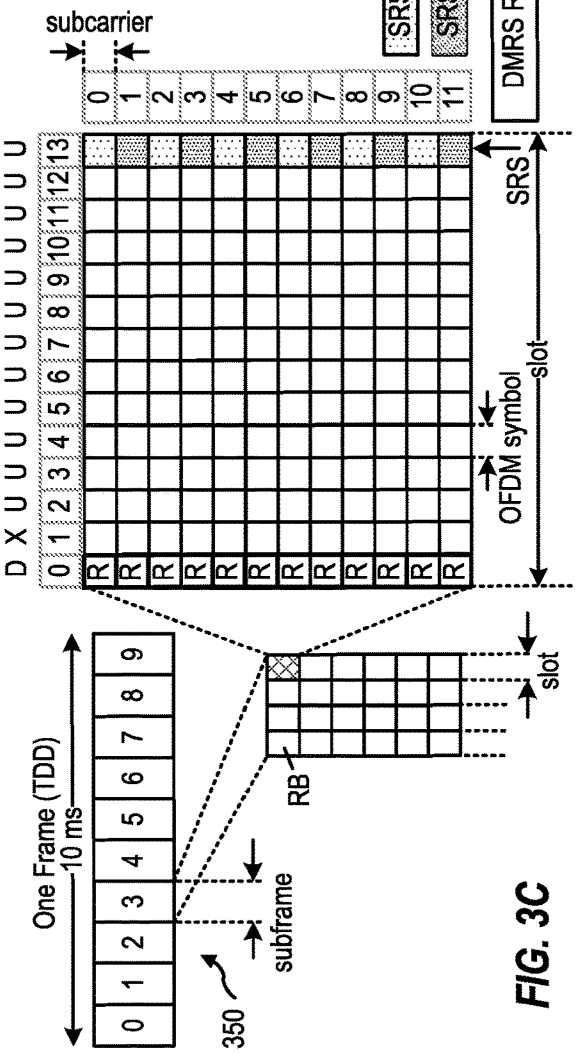

FIGS. 3A-3D depict aspects of structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, BS 180 may utilize beamforming 182 with the UE 104 to improve path loss and range. To do so, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Example Single RB PUCCH Resource Set

A UE may be configured with a set of dedicated PUCCH resources and a set of common PUCCH resources for sending PUCCH transmissions. For example, the UE may send a PUCCH transmission with uplink control information (UCI), such as hybrid automatic repeat request (HARP) acknowledgment (ACK) information.

A UE may perform a random access channel (RACH) procedure to establish a radio resource control (RRC) connection with a network. The UE may send PUCCH transmissions using the dedicated PUCCH resource after the RRC connection is established. For example, the UE may be provided with an RRC dedicated PUCCH resource set by the parameter PUCCH-ResourceSet in PUCCH-Config.

Before a UE has a dedicated RRC configuration, the UE may send PUCCH transmissions using a PUCCH resource from the common set of PUCCH resources. One example of a set of common PUCCH resources is in 3GPP TS 38.213 v16.5.0, Table 9.2.1-1, shown in Table 400 in FIG. 4. A PUCCH resource set may include a PUCCH format, a first symbol index, a number of symbols, a physical resource block (PRB) offset value $(RB_{BWP}^{offset})$, and a set of initial CS indexes. In the example illustrated in Table 400, the common PUCCH resource set may be indexed (e.g., indexes 0-15), and each index value for a row in the Table 400 includes a corresponding PUCCH format, first symbol index, number of symbols, PRB offset, and set of initial CS indexes. The number of CSs ($N_{CS}$) in each set of CSs in the PUCCH resource set may be different for different PUCCH resources (e.g., different rows in the Table 400). The common PUCCH resource may be configured for 1 RB PUCCH transmission.

The PUCCH resource set may be configured via system information block (SIB) Type 1 (e.g., SIB1). The PUCCH resource set may be configured for the initial uplink bandwidth part (BWP). The initial uplink BWP may be the initial BWP of the primary serving cell (PCell). The initial uplink BWP may have a size of $$N_{BWP}^{size}$$

PRBs. A parameter (e.g., the parameter pucch-ResourceCommon) in SIB1 can indicate the PUCCH resource set. The parameter may be a value between [0, 15] pointing to a row index of the table 400. The SIB1 may be sent after a synchronization signal block (SSB) is sent. The SSB contains a physical broadcast channel (PBCH) with a master information block (MIB). The MIB may provide the UE information to find the SIB1.

The network may send DCI to the UE with information used by the UE to derive a PUCCH resource from the common PUCCH resource set. For example, during initial access, the network may send the UE a DCI format 1_0 to schedule a Msg4 transmission. The DCI may include a PUCCH resource indicator (PRI). The PRI may be in a 3-bit PRI field of the DCI. The UE can use the value of the PRI bits to derive the PUCCH resource to send an HARQ (e.g., ACK or NACK) bit for the network. For example, the UE may use the PUCCH resource to send the network a PUCCH transmission with HARQ ACK information for the scheduled Msg4. The DCI may be received in a PDCCH in a control resource set (CORESET).

To determine the PUCCH resource, the UE may determine a PUCCH resource index $\gamma_{PUCCH}$. $\gamma_{PUCCH}$ may be determined as:

$$\gamma_{PUCCH} = \left\lfloor \frac{2 \cdot n_{CCE,0}}{N_{CCE},\ 0} \right\rfloor + 2 \cdot \Delta_{PRI}, \quad \text{Eq. 1}$$

where $\gamma_{PUCCH}$ is a PUCCH resource index, $N_{CCE,0}$ is a total number of control channel element (CCEs) in the CORESET in which the PDCCH with the DCI is received, $n_{CCE,0}$ is an index of the first CCE of the CCEs containing the PDCCH, and $\Delta_{PRI}$ is the value of PRI in the DCI. In some examples, $0 \le \gamma_{PUCCH} \le 15$, as shown in table 400.

The UE may send a PUCCH transmission using frequency hopping if the PUCCH transmission occupies more than one symbol (the symbols occupied by a PUCCH transmissions may be referred to herein as PUCCH symbols). The UE may transmit the PUCCH using a first PRB in a first set of PUCCH symbols and a different PRB in a second set of PUCCH symbols. For a PUCCH resource with the first symbol as $S_{start}$, and a total number of symbols S, the first set of PUCCH symbols may be the first half of the total number of symbols starting with the first symbol ($\{S_{start}, S_{start}+1, \ldots, S_{start}+[(S/2)-1]\}$) and the second set of PUCCH symbols may be the rest of symbols of the total number of symbols (($\{S_{start}+[S/2]), S_{start}+[(S/2)+1], \ldots, S_{start}+[(S-1]\}$).

The UE may determine the PRB index in the first set of PUCCH symbols and the PRB index in the second set of PUCCH symbols. The determination of the PRB index may be based on the PUCCH resource index.

If $\gamma_{PUCCH}<8$, the UE may determine the PRB index in the first set of PUCCH symbols as:

$$RB_{BWP}^{offset} + \left\lfloor \frac{\gamma_{PUCCH}}{N_{CS}} \right\rfloor \quad \text{Eq. 2}$$

If $\gamma_{PUCCH}<8$, the UE may determine the PRB index in the second set of PUCCH symbols as:

$$N_{BWP}^{size} - 1 - RB_{BWP}^{offset} - \left\lfloor \frac{\gamma_{PUCCH}}{N_{CS}} \right\rfloor, \quad \text{Eq. 3}$$

where $$RB_{BWP}^{size}$$

is a total number of PRBs in the configured uplink BWP.

If $\gamma_{PUCCH}\ge 8$, the UE may determine the PRB index in the first set of PUCCH symbols as:

$$N_{BWP}^{size} - 1 - RB_{BWP}^{offset} - \left\lfloor \frac{\gamma_{PUCCH-8}}{N_{CS}} \right\rfloor \quad \text{Eq. 4}$$

If $\gamma_{PUCCH}\ge 8$, the UE may determine the PRB index in the second set of PUCCH symbols as:

$$RB_{BWP}^{offset} + \left\lfloor \frac{\gamma_{PUCCH-8}}{N_{CS}} \right\rfloor \quad \text{Eq. 5}$$

The UE determines an initial CS ($CS_i$), from the set of initial CSs. As described above, the set of initial CSs may be determined with the PUCCH resource index (e.g., pointing to a row in the table 400, which includes a set of initial CSs). If $\gamma_{PUCCH}<8$, the UE determines the initial as the i-th CS index from the set of initial CS indexes where i is determined as:

$$\gamma_{PUCCH} \bmod N_{CS} \quad \text{Eq. 6}$$

If $\gamma_{PUCCH}\ge 8$, the UE may determine the initial CS as the i-th CS index from the set of initial CS indexes where i is determined as:

$$(\gamma_{PUCCH} - 8) \bmod N_{CS} \quad \text{Eq. 7}$$

Figure 5:
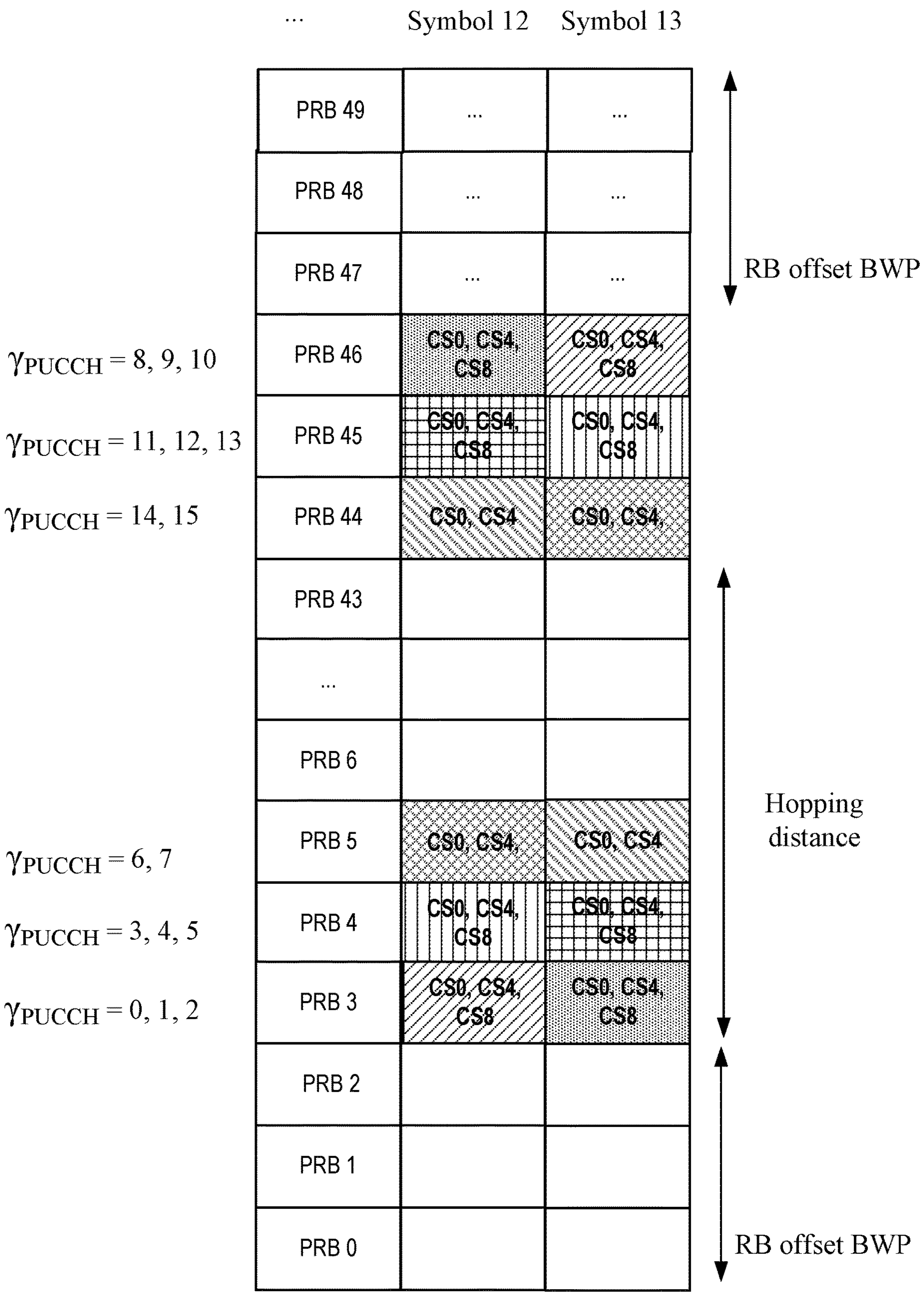
FIG. 5 is an example common PUCCH resource, in accordance with certain aspects of the present disclosure.

FIG. 5 is an example of common PUCCH resources, in accordance with certain aspects of the present disclosure. The example illustrated in FIG. 5 may be for a one-RB PUCCH transmission, where the SIB1 indicated the index=2, and where the BWP size is 50 PRBs. The UEs may receive different values of PRI, however, providing different RBs and/or different CSs for the UEs. UEs configured with PUCCH resources that are using a same RB, but different CSs, may be referred to herein as a "resource group". Referring to the Table 400, for index=2, the UEs may be configured to use PUCCH format 0, the first symbol is 12, the total number of symbols is 2, the PRB offset is 3, and the set of initial CS indexes is {0,4,8}. In the example shown in FIG. 5, there are six resource groups, each resource group uses a different RB in the PUCCH symbol, and the PUCCH resources in a resource group use different initial CSs.

In some systems (e.g., 3GPP Release 15 systems or earlier), the UE sends a 1-RB (i.e., a single RB) PUCCH format 0 or a 1-RB PUCCH format 1 (e.g., referred to herein as PUCCH format 0/1). For example, as shown in Table 400, the PUCCH format is 0 or 1 and as shown in FIG. 5, the UE sends a 1-RB PUCCH.

A single RB, however, may not be sufficient to achieve maximum transmission power for PUCCH transmission. For example, a 120 kHz subcarrier spacing (SCS) may be supported, such as in FR2. In certain regulatory regions (e.g., the current European Telecommunications Standards Institute (ETSI)), in a 60 GHz unlicensed band, a 23 dBm/MHz power spectral density (PSD) regulatory limit and a 40 dBm Effective, Equivalent, or Isotropically (or Isotropic) Radiated Power (EIRP) limit may be enforced.

With 120 kHz SCS, a single RB is 1.44 MHz, which corresponds to a 24.58 dBm transmit power. For a normal UE, the maximum EIRP may be small, such as around 23 dBm EIRP. In this case, with 120 kHz SCS, a single RB can already consume all of the transmit power.

In some systems (e.g., 3GPP 5G NR Release 17 systems and beyond), the UE may support PUCCH transmission that occupies multiple RBs (e.g., referred to herein as multi-RB PUCCH). The UE may support multi-RB (multi-RB) PUCCH format 0, multi-RB PUCCH format 1, and multi-RB PUCCH format 4 transmission (e.g., referred to herein as PUCCH format 0/1/4) in certain frequency bands (e.g., in the 52.6 GHz to 71 GHz band).

Accordingly, what is needed are techniques and apparatus for PUCCH resource determination for common PUCCH resource sets and dedicated PUCCH resource sets for multi-RB PUCCH transmission.

Example Multi-RB PUCCH Resource Set

According to certain aspects, a new parameter, referred to herein as a "number of resource blocks (RBs)" parameter ($N_{RB}$) is signaled to UEs for use in PUCCH resource determination by the UE. The $N_{RB}$ parameter may also (or alternatively) be hardcoded in a 3GPP technical standard and hardcoded at the UE. The $N_{RB}$ parameter may be signaled to the UEs in system information. For example, the $N_{RB}$ parameter may be signaled to the UEs in a SIB1. The $N_{RB}$ may be signaled in the SIB 1 in addition to an indication of a PUCCH resource set index. The $N_{RB}$ and indication of the PUCCH resource set index may signaled to the UEs in a pucch-ResourceCommon information element (IE) in the SIB1. The PUCCH resource set index may indicate a PUCCH resource set from multiple PUCCH resource sets. For example, the PUCCH resource set index may point to a row of the Table 400 as discussed above. The $N_{RB}$ parameter may be used by the UEs to determine a number of RBs to use for PUCCH transmission. The $N_{RB}$ parameter may also be used by the UEs to determine a lowest RB index for PUCCH transmission in a PUCCH symbol.

According to certain aspects, the UEs may be configured to send PUCCH transmissions using the same number of RBs. For example, the UEs may send PUCCH format 0/1 transmission using the $N_{RB}$ RBs, where $N_{RB}$ is greater than 1 indicating a multi-RB PUCCH transmission. If the $N_{RB}$ parameter is not provided to the UEs, the UEs may transmit a 1-RB PUCCH (e.g., the legacy 1-RB PUCCH discussed above). The initial CS used by the UEs for sending a PUCCH transmission may be dependent on whether the PUCCH transmission uses a long sequence.

Figure 6:
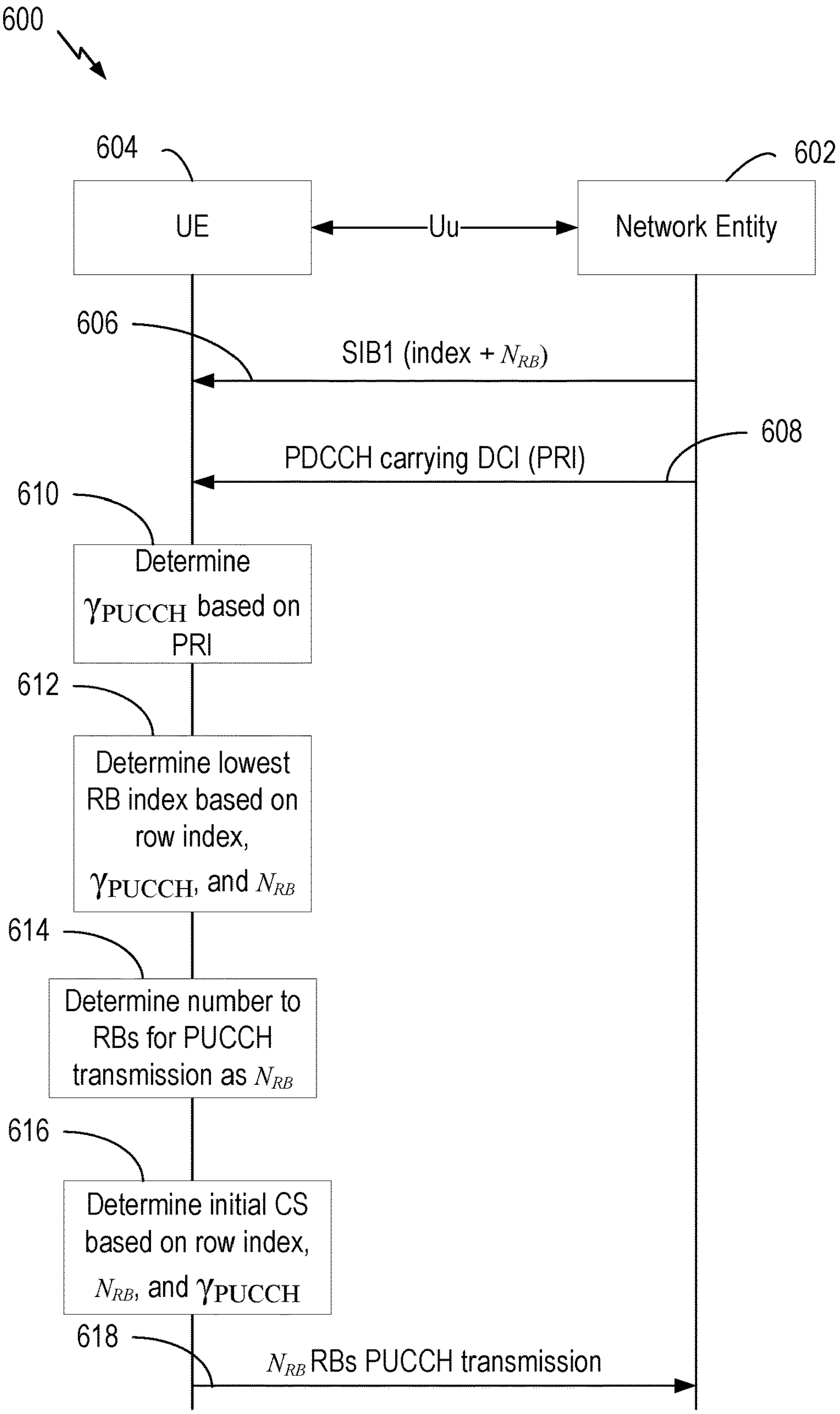
FIG. 6 is a call flow diagram illustrating example signaling for a same number of RBs for all UEs for a common PUCCH multi-RB resource, in accordance with aspects of the present disclosure.

FIG. 6 is a call flow diagram illustrating example signaling 600 for by UEs that use a same number of RBs for multi-RB PUCCH transmissions using a common PUCCH resource, in accordance with aspects of the present disclosure.

As shown, at 606, the $N_{RB}$ parameter may be provided to UE 604 (e.g., such as a UE 104 shown in FIG. 1) in SIB1 from a network entity 602 (e.g., such as a UE 104 shown in FIG. 1) along with a common PUCCH resource set index (e.g., in a pucch-ResourceCommon parameter). The SIB1 may be received prior to receiving an RRC dedicated PUCCH configuration. The common PUCCH resource set index may indicate a common PUCCH resource set including a set of cell-specific PUCCH resources. The common PUCCH resource set index may indicate one common PUCCH resource set from multiple common PUCCH resource sets for the initial uplink BWP. The initial UL BWP may be the initial UL BWP for a primary serving cell (PCell). The initial UL BWP has a size of $$N_{BWP}^{size}$$

PRBs that may be indicated as part of the common PUCCH resource set configuration.

The common PUCCH resource set may correspond to a PUCCH format for PUCCH transmission, a first (e.g., starting) symbol index for PUCCH transmission, a total number of symbols for PUCCH transmission, a PRB offset value $$RB_{BWP}^{offset}$$

for PUCCH transmission, and a set of initial CS indexes with a total number of initial CSs in the CS set of $N_{CS}$. One example of a set of common PUCCH resources is in 3GPP TS 38.213 v16.50, Table 9.2.1-1, and shown in Table 400 and discussed above with respect to FIG. 4. The common PUCCH resource set index in the SIB1 may point to a row index in the Table 400.

At 608, UE 604 receives DCI from network entity 602 in a PDCCH. The DCI may be received in a CORESET. The DCI may be a DCI format 1_0. The DCI may include a PRI. The DCI may include the PRI in a 3-bit PRI field.

At 610, UE 604 determines a PUCCH resource index based on the PRI bits. In some examples, UE 604 determines $\gamma_{PUCCH}$ using the Eq. 1 discussed above.

At 612, UE 604 determines a lowest RB index based on $\gamma_{PUCCH}$ and the $N_{RB}$ parameter. The lowest RB may be a starting RB for a multi-RB PUCCH transmission.

If $\gamma_{PUCCH}<8$, UE 604 may determine the lowest PRB index in a first set of one or more PUCCH symbols as:

$$RB_{BWP}^{offset}*N_{RB}+\left\lfloor\frac{\gamma_{PUCCH}}{N_{CS}}\right\rfloor*N_{RB} \quad \text{Eq. 8}$$

If $\gamma_{PUCCH}<8$, UE 604 may determine the lowest PRB index in the second set of PUCCH symbols as:

$$N_{BWP}^{size}-RB_{BWP}^{offset}*N_{RB}-\left(\left\lfloor\frac{\gamma_{PUCCH}}{N_{CS}}\right\rfloor+1\right)*N_{RB} \quad \text{Eq. 9}$$

If $\gamma_{PUCCH}\geq 8$, UE 604 may determine the lowest PRB index in the first set of PUCCH symbols as:

$$N_{BWP}^{size}-RB_{BWP}^{offset}*N_{RB}-\left(\left\lfloor\frac{\gamma_{PUCCH-8}}{N_{CS}}\right\rfloor+1\right)*N_{RB} \quad \text{Eq. 10}$$

If $\gamma_{PUCCH}\geq 8$, UE 604 may determine the lowest PRB index in the second set of PUCCH symbols as:

$$RB_{BWP}^{offset}*N_{RB}+\left\lfloor\frac{\gamma_{PUCCH-8}}{N_{CS}}\right\rfloor*N_{RB} \quad \text{Eq. 11}$$

At 614, UE 604 may determine the number of RBs to use for PUCCH transmission as $N_{RB}$ RBs.

At 616, UE 604 may determine an initial CS based on the $N_{RB}$ parameter and the determined $\gamma_{PUCCH}$. If $\gamma_{PUCCH}<8$, UE 604 determines the initial CS as $CS_i*N_{RB}$, where $CS_i$ is the i-th CS index from the set of initial CS indexes, and i is determined as:

$$\gamma_{PUCCH} \bmod N_{CS} \quad \text{Eq. 12}$$

If $\gamma_{PUCCH}\geq 8$, the UE may determine the initial CS as $CS_i*N_{RB}$, where $CS_i$ is the i-th CS index from the set of initial CS indexes, and i is determined:

$$(\gamma_{PUCCH}-8) \bmod N_{CS} \quad \text{Eq. 13}$$

At 618, UE 604 sends a PUCCH transmission (e.g., PUCCH format 0/1) using $N_{RB}$ RBs. UE 604 may transmit PUCCH using the determine PUCCH resource prior to receiving a UE-specific dedicated RRC configuration (e.g., provided by PUCCH-ResourceSet in PUCCH-Config). In an example, UE 604 uses the PUCCH resource to send uplink information, such as hybrid automatic repeat request (HARQ) acknowledgment (ACK) information to a Msg 4.

Figure 7:
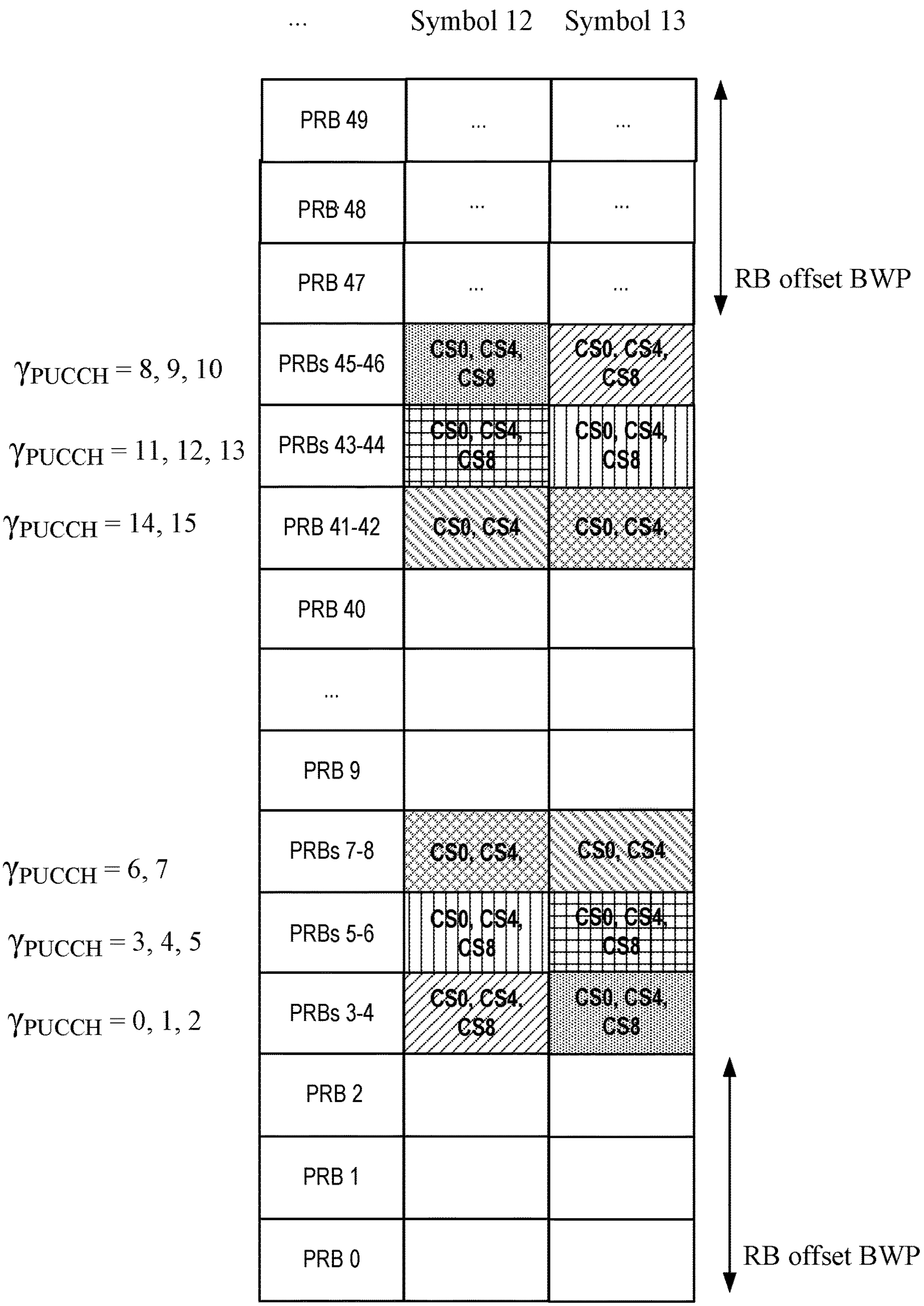
FIG. 7 is an example common PUCCH multi-RB resource with a same number of RBs for different UEs, in accordance with certain aspects of the present disclosure.

FIG. 7 illustrates example common PUCCH multi-RB resources with a same number of RBs, $N_{RB}$, for different UEs, in accordance with certain aspects of the present disclosure. In the example illustrated in FIG. 7, the PUCCH resource index (pucch-ResourceCommon) is equal to 2 pointing to the example PUCCH resource set configuration in Table 400 of FIG. 4 and $N_{RB}=2$. As shown in FIG. 7, each of the UEs send PUCCH transmissions using 2 PRBs in each symbol.

According to certain aspects, the number of RBs used by UEs may be flexible, where different resource groups may use different numbers of RBs for PUCCH format 0/1. For example, the network may signal the $N_{RB}$ parameter as a vector where $N_{RB}=n_i=\{n_0, n_1, \ldots n_{K-1}\}$, and where $$K=\left\lceil\frac{8}{N_{CS}}\right\rceil.$$

Figure 8:
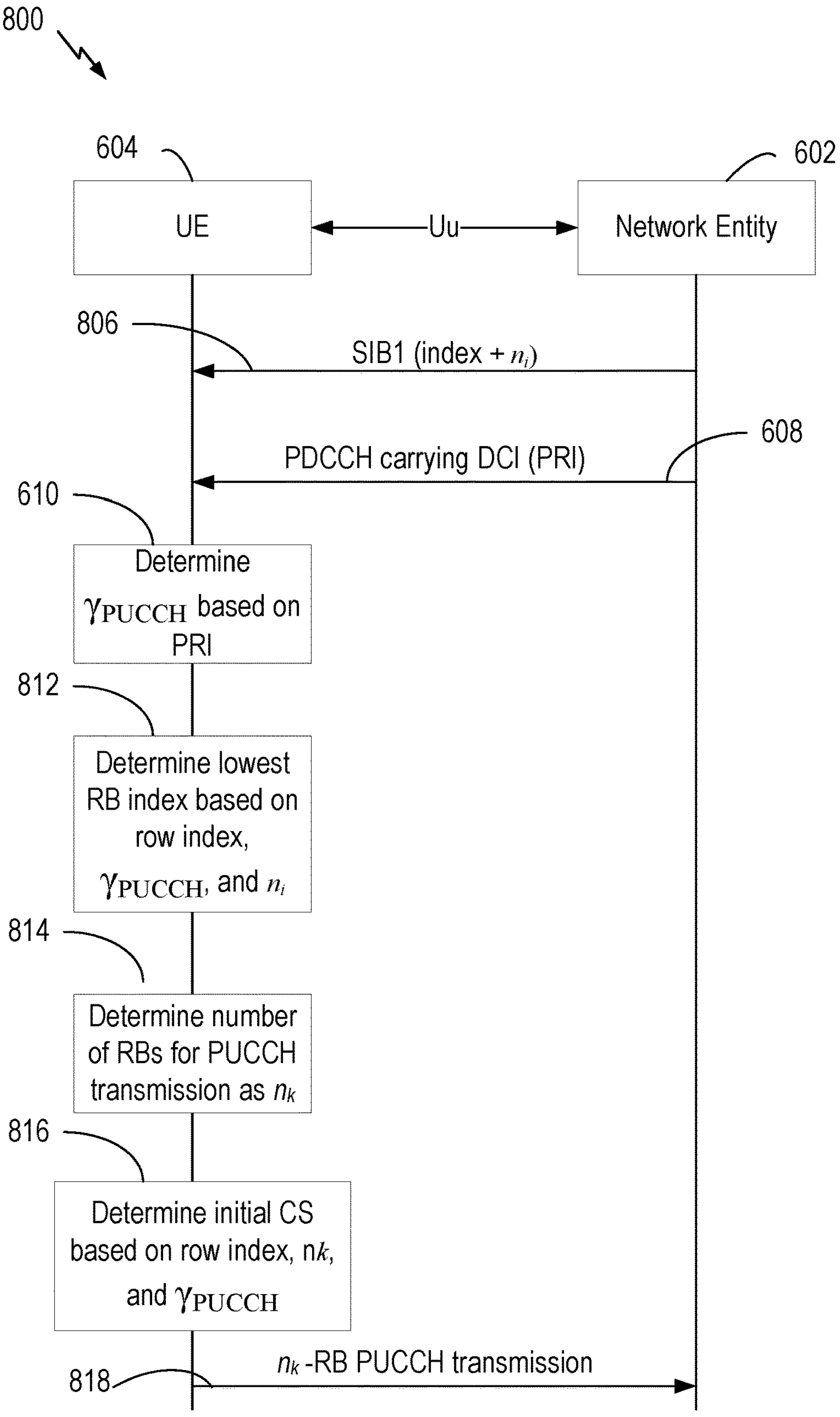
FIG. 8 is a call flow diagram illustrating example signaling for a vector number of RBs for all UEs for a common PUCCH multi-RB resource, in accordance with aspects of the present disclosure.

FIG. 8 is a call flow diagram illustrating example operations and signaling 800 for UEs of different resource groups using a different number of RBs for PUCCH transmission where the network signals a vector $N_{RB}$ parameter for the UEs for a common PUCCH multi-RB resource, in accordance with aspects of the present disclosure.

At 806, UE 604 receives SIB1 from network entity 602. The SIB contains a PUCCH resource index value and the vector of RBs $n_i$.

The steps at 608 and 610 in example operations and signaling 800 may be similar to the steps 608 and 610 in example operations and signaling 600.

At 812, UE 604 determines a lowest PRB index (e.g., a starting RB) based on the PUCCH resource index, a determined $\gamma_{PUCCH}$, and $n_i$. The UE may first determine an index value k. For example, if $\gamma_{PUCCH}<8$, UE 604 determines:

$$k=\left\lfloor\frac{\gamma_{PUCCH}}{N_{CS}}\right\rfloor \quad \text{Eq. 14}$$

If $\gamma_{PUCCH}\geq 8$, UE 604 determines:

$$k=\left\lfloor\frac{\gamma_{PUCCH-8}}{N_{CS}}\right\rfloor \quad \text{Eq. 15}$$

Based on the index value k, UE 604 can determine an RB offset parameter $RB_{offset,k}$. For example, UE 604 may determine the RB offset parameter as:

$$RB_{offset,k}=\sum_{0}^{k-1} n_i \quad \text{Eq. 16}$$

The RB offset parameter can be used to determine the RB index. For example, if $\gamma_{PUCCH}<8$, UE 604 may determine the lowest PRB index in the first set of PUCCH symbols as:

$$RB_{BWP}^{offset}*\left(\sum_{0}^{K-1} n_i\right)/K+RB_{offset,k} \quad \text{Eq. 17}$$

If $\gamma_{PUCCH}<8$, UE 604 may determine the lowest PRB index (e.g., starting RB) in the second set of PUCCH symbols as:

$$N_{BWP}^{size}-RB_{BWP}^{offset}*\left(\sum_{0}^{K-1} n_i\right)/K-RB_{offset,k}-n_k \quad \text{Eq. 18}$$

If $\gamma_{PUCCH}\geq 8$, UE 604 may determine the lowest PRB index in the first set of PUCCH symbols as:

$$N_{BWP}^{size} - RB_{BWP}^{offset} * \left(\sum_{0}^{K-1} n_i\right)/K - RB_{offset,k} - n_k \quad \text{Eq. 19}$$

If $\gamma_{PUCCH} \geq 8$, UE 604 may determine the lowest PRB index in the second set of PUCCH symbols as:

$$RB_{BWP}^{offset} * \left(\sum_{0}^{K-1} n_i\right)/K + RB_{offset,k} \quad \text{Eq. 20}$$

At 814, UE 604 determines the number of RBs to use for PUCCH transmission as $n_k$ based on the determined index k to the vector of RBs. UE 604 and network entity 602 may pre-negotiate the number of RBs for PUCCH format 0/1. Thus, when network entity 602 signals the PUCCH resource index and the PRI to the UEs, network entity 602 can select the PRI values according to the pre-negotiated number of RBs (e.g., such that $n_k$=the pre-negotiated number of RBs).

At 816, UE 604 may determine an initial CS based on the PUCCH resource index and the determined $\gamma_{PUCCH}$. If $\gamma_{PUCCH} < 8$, UE 604 may determine the initial CS as $CS_i * n_k$, where $CS_i$ is the i-th CS index from the set of initial CS indexes (i.e., the set of CS indexes associated with the indicated PUCCH resource index), and i is determined:

$$\gamma_{PUCCH} \bmod N_{CS} \quad \text{Eq. 21}$$

If $\gamma_{PUCCH} \geq 8$, the UE 604 may determine the initial as $CS_i * n_k$, where $CS_i$ is the i-th CS index from the set of initial CS indexes, and i is determined:

$$(\gamma_{PUCCH} - 8) \bmod N_{CS} \quad \text{Eq. 22}$$

At 818, UE 604 sends a PUCCH transmission (e.g., a PUCCH format 0/1 transmission) using $n_k$ RB(s).

Figure 9:
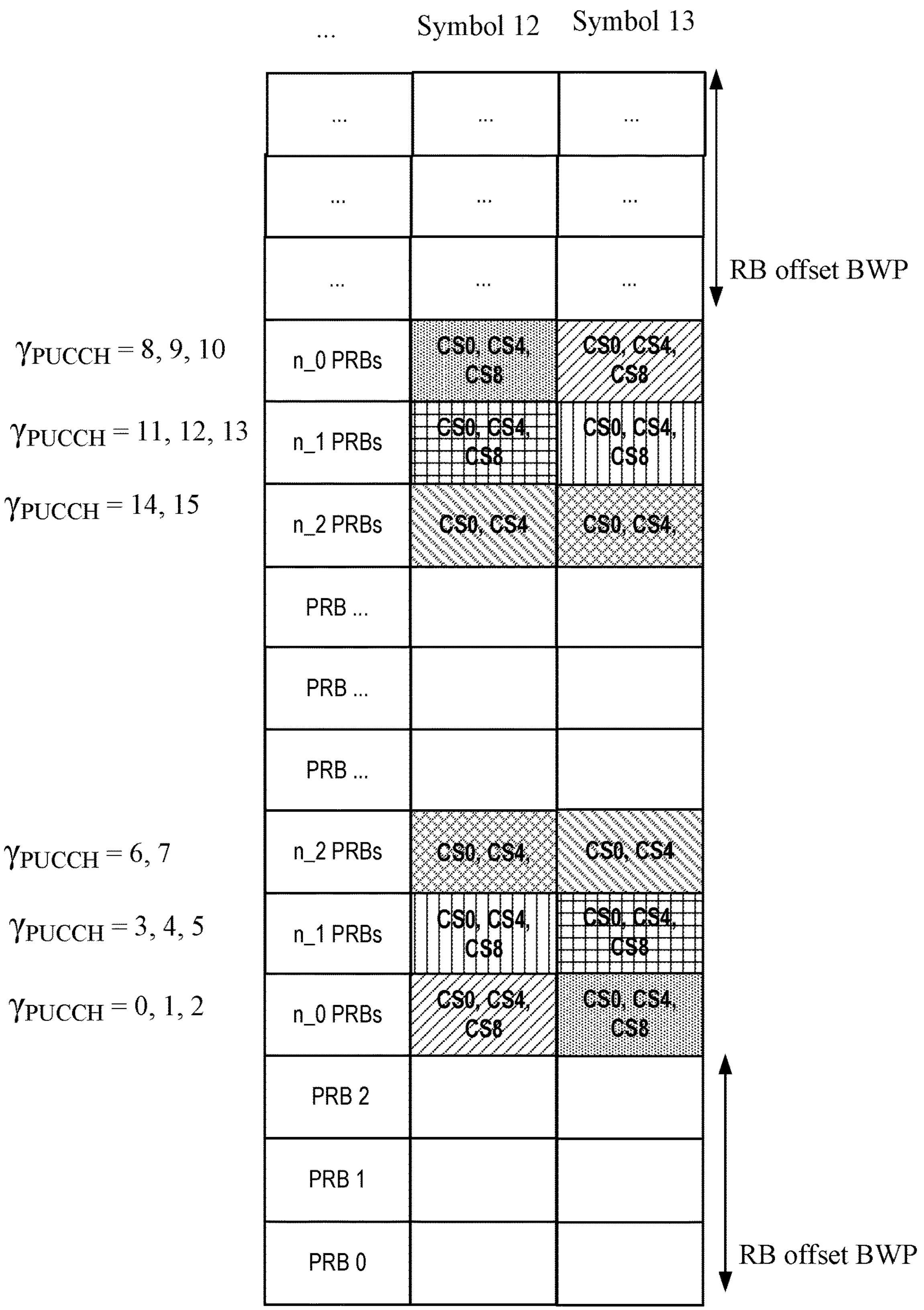
FIG. 9 is an example common PUCCH multi-RB resource with different numbers of RBs, in accordance with certain aspects of the present disclosure.

FIG. 9 is an example multi-RB common PUCCH resource set with different numbers of RBs for different resource groups, in accordance with certain aspects of the present disclosure. As shown in FIG. 9, UEs in same resource groups use the same number of RBs, while UEs in different resource group may use different numbers of RBs (e.g., $n_k$ RBs).

According to certain aspects, network entity 602 signals the $N_{RB}$ parameter $N_{RB}$ as discussed above, however, the UEs in the same resource group can use different numbers of RBs for transmitting PUCCH.

Figure 10:
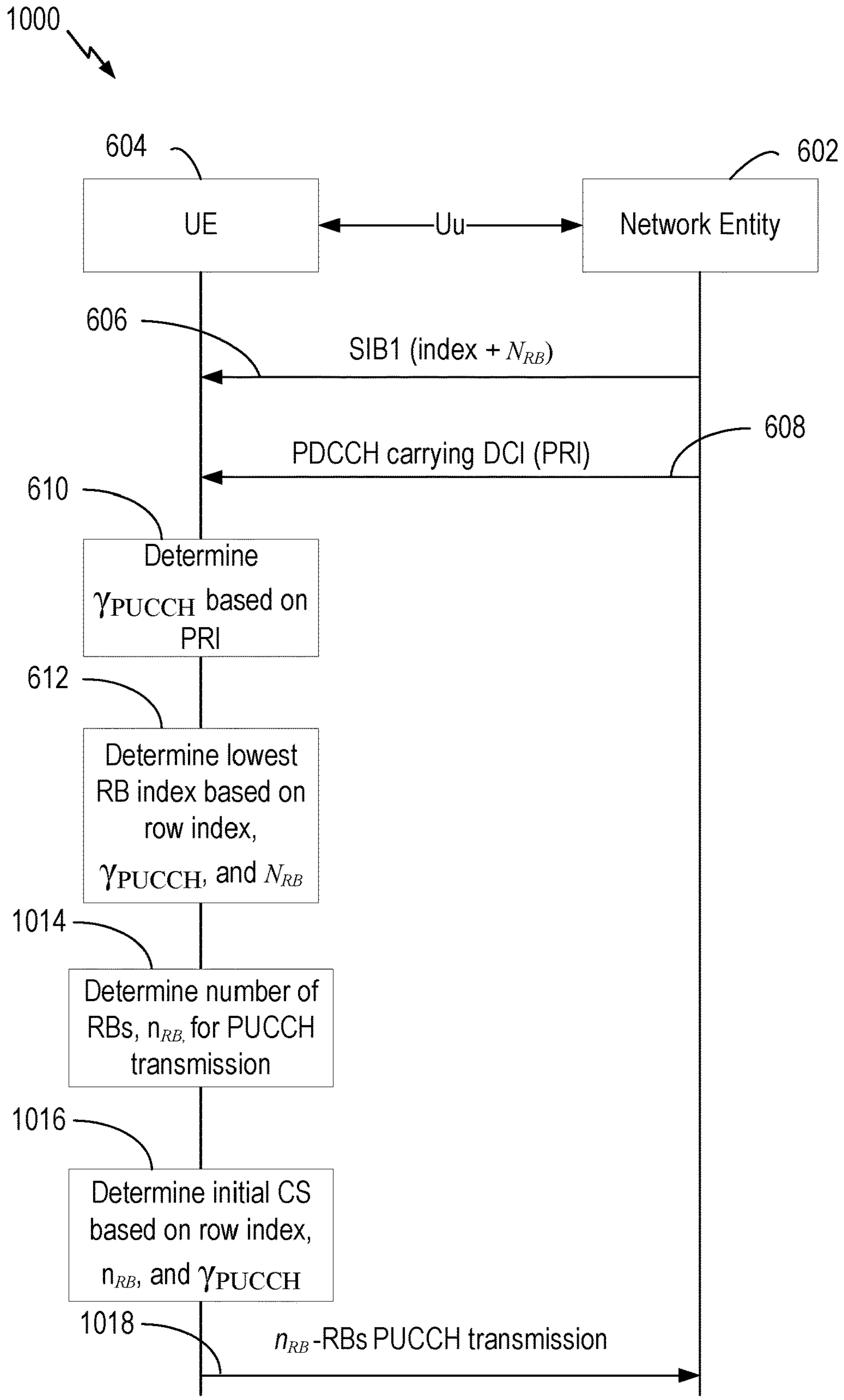
FIG. 10 is a call flow diagram illustrating example signaling for different numbers of RBs for UEs for a common PUCCH multi-RB resource, in accordance with aspects of the present disclosure.

FIG. 10 is a call flow diagram illustrating example operations and signaling 1000 for different numbers of RBs for UEs for a multi-RB common PUCCH resource, in accordance with aspects of the present disclosure. As shown in FIG. 10, UE 604 and network entity 602 may perform the operations 606-612 as discussed above with respect to FIG. 6.

The steps at 606, 608, 610, and 612 in example operations and signaling 1000 may be similar to the steps 606, 608, 610, and 612 in example operations and signaling 600.

At 1014, UE 604 determines the number of RBs to use for PUCCH transmission $n_{RB}$ RBs. For example, UE 604 and network entity 602 may pre-negotiated $n_{RB}$ RBs to use for sending PUCCH format 0/1, at 1018. For example, UE 604 and network entity 602 can negotiate $n_{RB}$ during a RACH procedure, such as in a physical random access channel (PRACH) preamble, a random access message 3 (Msg3), and/or other messages. UEs in the same resource group will have the same first RB index, but the UEs may occupy different number of RBs for PUCCH transmission.

At 1016, UE 604 may determine an initial CS based on the PUCCH resource index, $n_{RB}$, and the determined $\gamma_{PUCCH}$. If $\gamma_{PUCCH} < 8$, UE 604 may determine the initial CS as $CS_i * n_{RB}$, where $CS_i$ is the i-th the i-th CS index from the set of initial CS indexes, and i is determined as:

$$\gamma_{PUCCH} \bmod N_{CS} \quad \text{Eq. 23}$$

If $\gamma_{PUCCH} \geq 8$, UE 604 may determine the initial CS as $CS_i * n_{RB}$, where $CS_i$ is the i-th CS index from the set of initial CS indexes, and i is determined as:

$$(\gamma_{PUCCH} - 8) \bmod N_{CS} \quad \text{Eq. 24}$$

At 1018, UE 604 transmits a PUCCH format 0/1 transmission using the $n_{RB}$ RBs.

Figure 11:
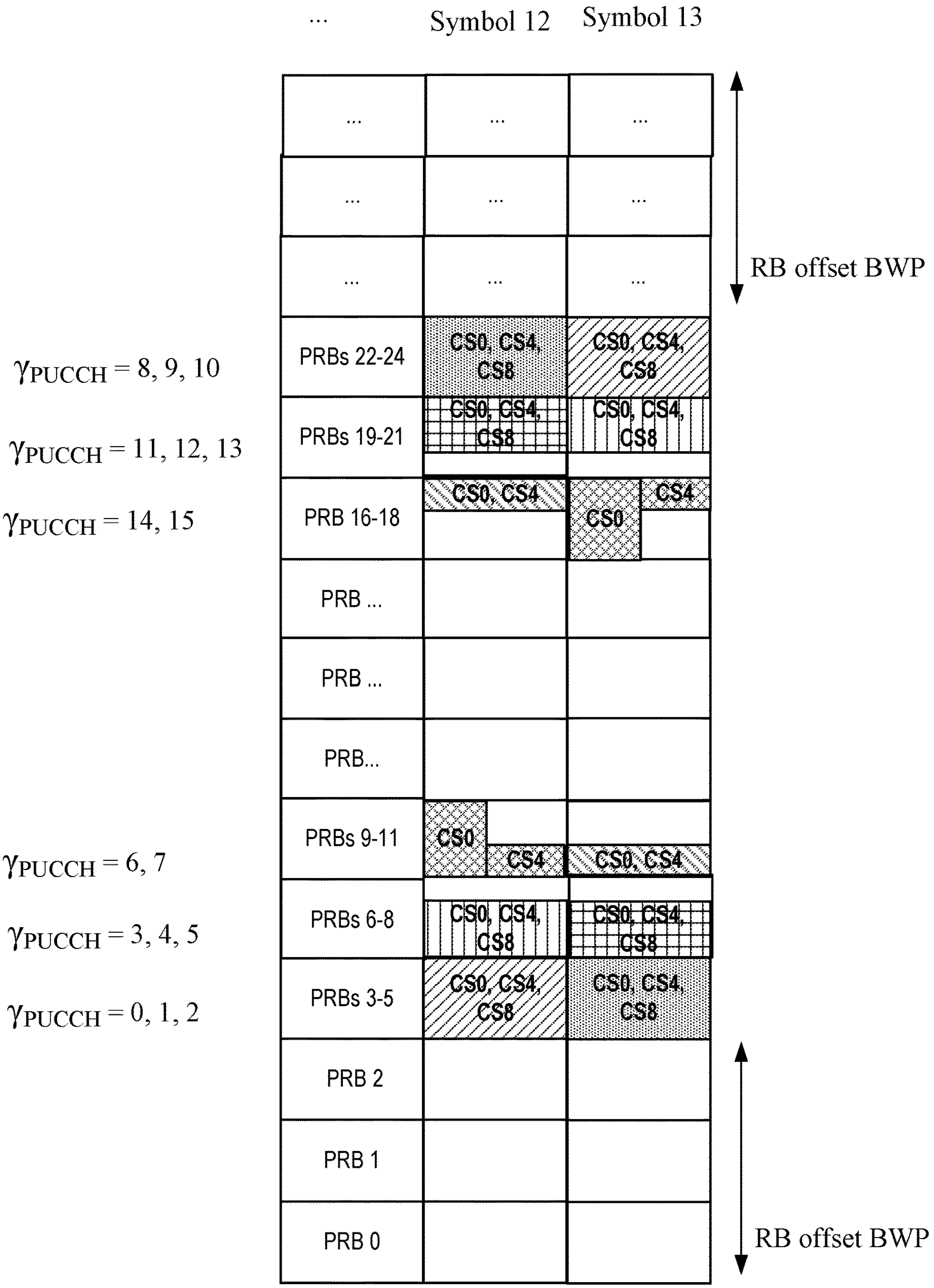
FIG. 11 is an example common PUCCH multi-RB resource with different numbers of RBs for different UEs, in accordance with certain aspects of the present disclosure.

FIG. 11 is an example common PUCCH multi-RB resource with different numbers of RBs for different UEs, in accordance with certain aspects of the present disclosure. As shown in FIG. 11, UEs in a resource group may have the same starting RB index, but may use different numbers of RBs. FIG. 11 illustrates an example with $N_{RB}$=3, where different UEs in a resource group transmit PUCCH in the symbol using 1 RB, 2 RBs, and 3 RBs.

Figure 12:
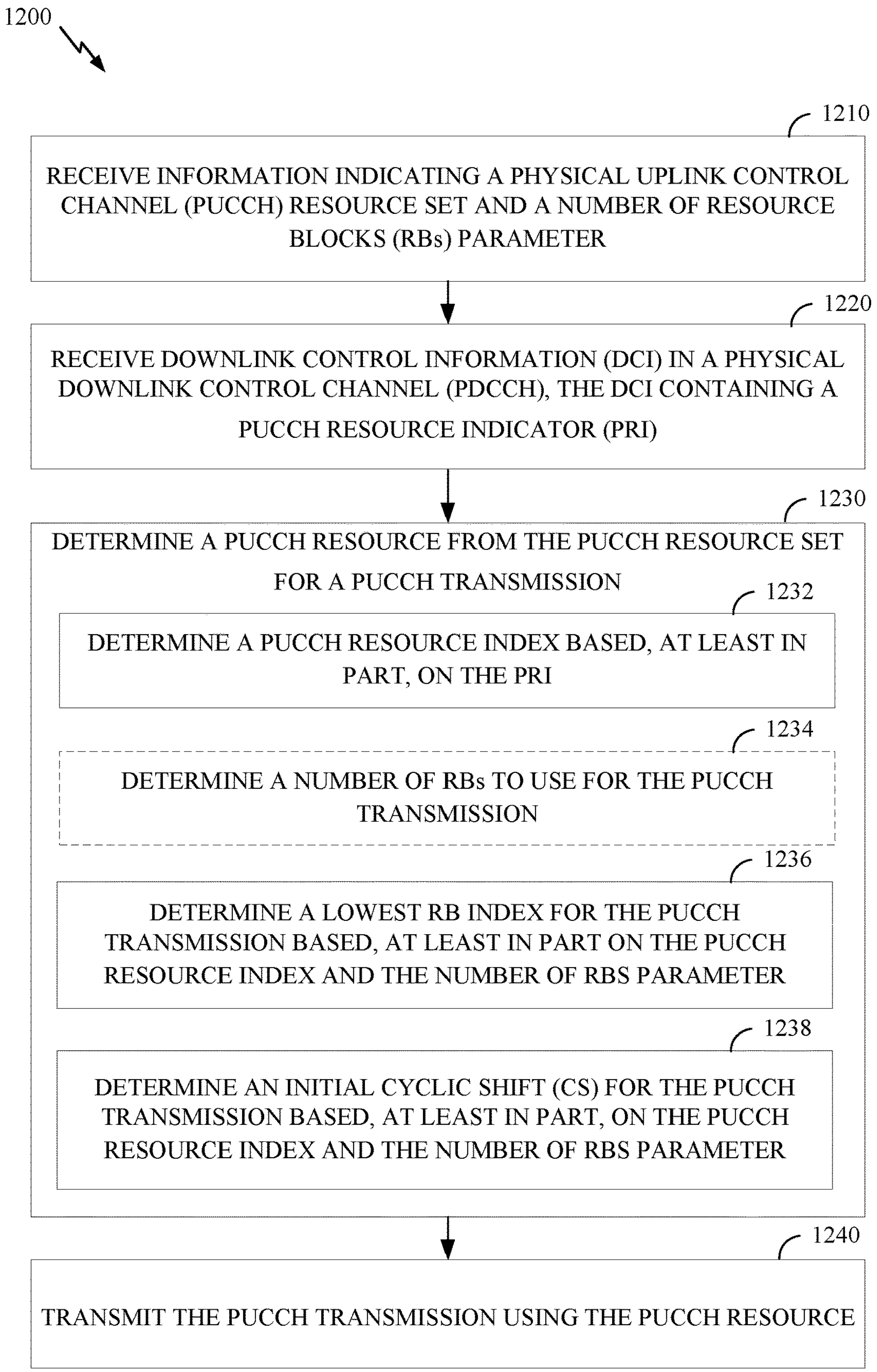
FIG. 12 is a flow diagram illustrating example operations for wireless communication by a UE, in accordance with certain aspects of the present disclosure.

FIG. 12 is a flow diagram illustrating example operations 1200 for wireless communication, in accordance with certain aspects of the present disclosure. The operations 1200 may be performed, for example, by a UE (such as a UE 104 in the wireless communication network 100). The operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1200 may begin, at block 1210, by receiving information. The information indicates a PUCCH resource set and a number of RBs parameter.

At block 1220, the UE receives DCI in a PDCCH. The DCI contains a PRI.

At block 1230, the UE determines a PUCCH resource from the PUCCH resource set for a PUCCH transmission.

Determining the PUCCH resource from the resource set for the PUCCH transmission, at 1230, includes determining a PUCCH resource index based, at least in part, on the PRI at block 1232.

Optionally, determining the PUCCH resource from the resource set for the PUCCH transmission, at 1230, may include determining a number of RBs to use for the PUCCH transmission at block 1234.

Determining the PUCCH resource from the resource set for the PUCCH transmission, at 1230, includes determining a lowest RB index for the PUCCH transmission based, at least in part on the PUCCH resource index and the number of RBs parameter at block 1236.

Determining the PUCCH resource from the resource set for the PUCCH transmission, at block 1230, includes determining an initial CS shift for the PUCCH transmission based, at least in part, on the PUCCH resource index and the number of RBs parameter, at block 1238.

At block 1240, the UE transmits the PUCCH transmission using the PUCCH resource.

Figure 13:
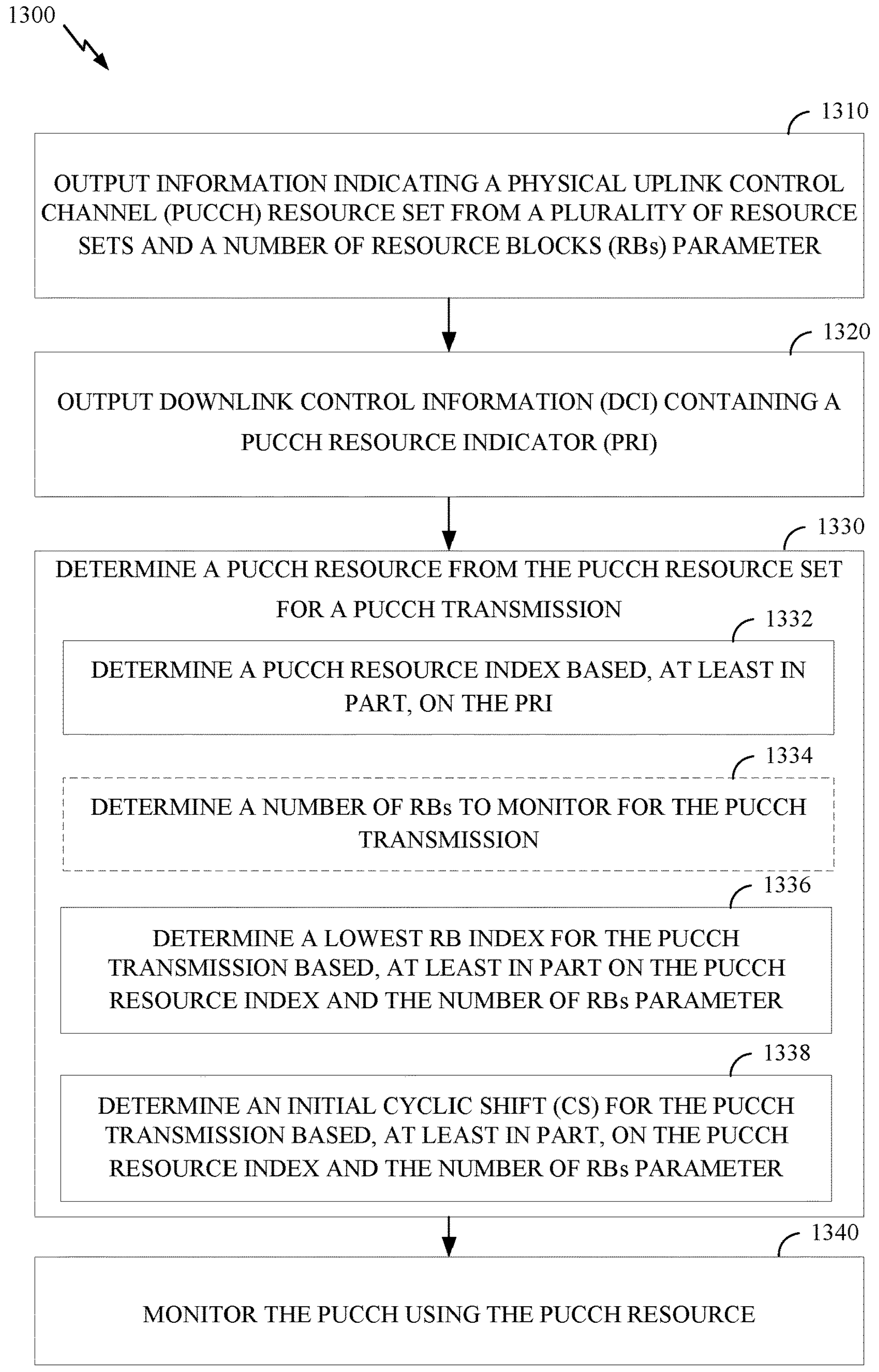
FIG. 13 is a flow diagram illustrating example operations for wireless communication by a network entity, in accordance with certain aspects of the present disclosure.

FIG. 13 is a flow diagram illustrating example operations 1300 for wireless communication, in accordance with certain aspects of the present disclosure. The operations 1300 may be performed, for example, by a network entity (such as a BS 102 in the wireless communication network 100). The operations 1300 may be complementary to the operations 1200 performed by the UE. The operations 1300 may be implemented as software components that are executed and run on one or more processors (e.g., controller/processor 240 of FIG. 2). Further, the transmission and reception of signals by the BS in operations 1300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1300 may begin, at block 1310, by outputting information indicating a PUCCH resource set and a number of RBs parameter.

At block 1320, the network entity output DCI containing a PRI.

At block 1330, the network entity determines a PUCCH resource from the PUCCH resource set for a PUCCH transmission.

Determining a PUCCH resource from the resource set for a PUCCH transmission, at 1330, includes determining a PUCCH resource index based, at least in part, on the PRI at block 1332.

Optionally, determining a PUCCH resource from the resource set for a PUCCH transmission, at 1330, includes determining a number of RBs to monitor for the PUCCH transmission at block 1334.

Determining a PUCCH resource from the resource set for a PUCCH transmission, at 1330, includes determining a lowest RB index for the PUCCH transmission based, at least in part on the PUCCH resource index and the number of RBs parameter at block 1336.

Determining a PUCCH resource from the resource set for a PUCCH transmission, at 1330, includes determining an initial CS shift for the PUCCH transmission based, at least in part, on the PUCCH resource index and the number of RBs parameter, at block 1338.

At block 1340, the BS monitors the PUCCH transmission using the PUCCH resource.

According to certain aspects, the network signals the UE, in SIB (e.g., SIB1), the PUCCH resource set index and the number of RBs parameter, but not all UEs use the signaled number of RBs parameter for PUCCH transmission and, instead, can derive the resource allocation with a different number of RBs. The number of RBs used by UEs may be flexible, where different resource groups may use different number of RBs for PUCCH format 0/1. The number of RBs used for the first and second K resource groups, $n_i=\{n_0, n_1, n_{K-1}\}$, can be derived, where $$K = \left\lceil \frac{8}{N_{CS}} \right\rceil$$

and there are a total 2*K different frequency resources for PUCCH. Thus, signaling overhead is reduced because the vector $[n_0, n_1, \ldots, n_{K-1}]$ is not signaled in SIB1; however, flexibility is provided for the number of RBs for PUCCH transmission by the UEs deriving the number of resources to use.

The derivation of the vector $[n_0, n_1, \ldots, n_{K-1}]$ may depend on the value of the number of RBs parameter, the size of the uplink bandwidth part (BWP), or both. The resource allocation could be hardcoded at the UE (e.g., specified in a 3GPP wireless standard). The UE may be hard coded to use a single RB for a first set of PUCCH resources (e.g., such as the first 8 PUCCH resources) and use the signaled number of RBs for a second set of PUCCH resources (e.g., such as the next 8 PUCCH resources). For example, the UE can use 1 RB for the first part of vector $[n_0, n_1, \ldots, n_{K/2}]$ and use the signaled number of RBs for the second part of the vector $[n_{[k/2]=1}, n_{[k/2]+2}, \ldots n_{K-1}]$ (in this example, it is assumed K is an even number). In another example, the UE is hardcoded to use a single RB for a first third of the PUCCH resources, the signaled number of RBs for the next third of PUCCH resources, and another value, such as half the signaled number of RBs for the next third of the PUCCH resources (in this example, it is assumed that K is a multiple of number three).

In an illustrative example of deriving the number of RBs to use based on the BWP size, the signaled number of RBs is equal to 12, the BWP size is equal to 65 RBs, $N_{CS}=2$, and $$RB_{BWP}^{offset} = 0.$$

As $N_{CS}=2$, for all eight common resource with $\gamma_{PUCCH}\leq 7$, the UEs can be organized into four resource groups. Among the four resource groups, the first two resource groups use a single RB for PUCCH and the remaining two resource groups use the signaled number of RBs. Similarly for four common resource groups with $\gamma_{PUCCH}\geq 8$, the first two resource group may use a single RB for PUCCH and the remaining two resource groups will use the signaled number of RBs, such that 2*K resource group fits into the UL BWP.

Figure 14:
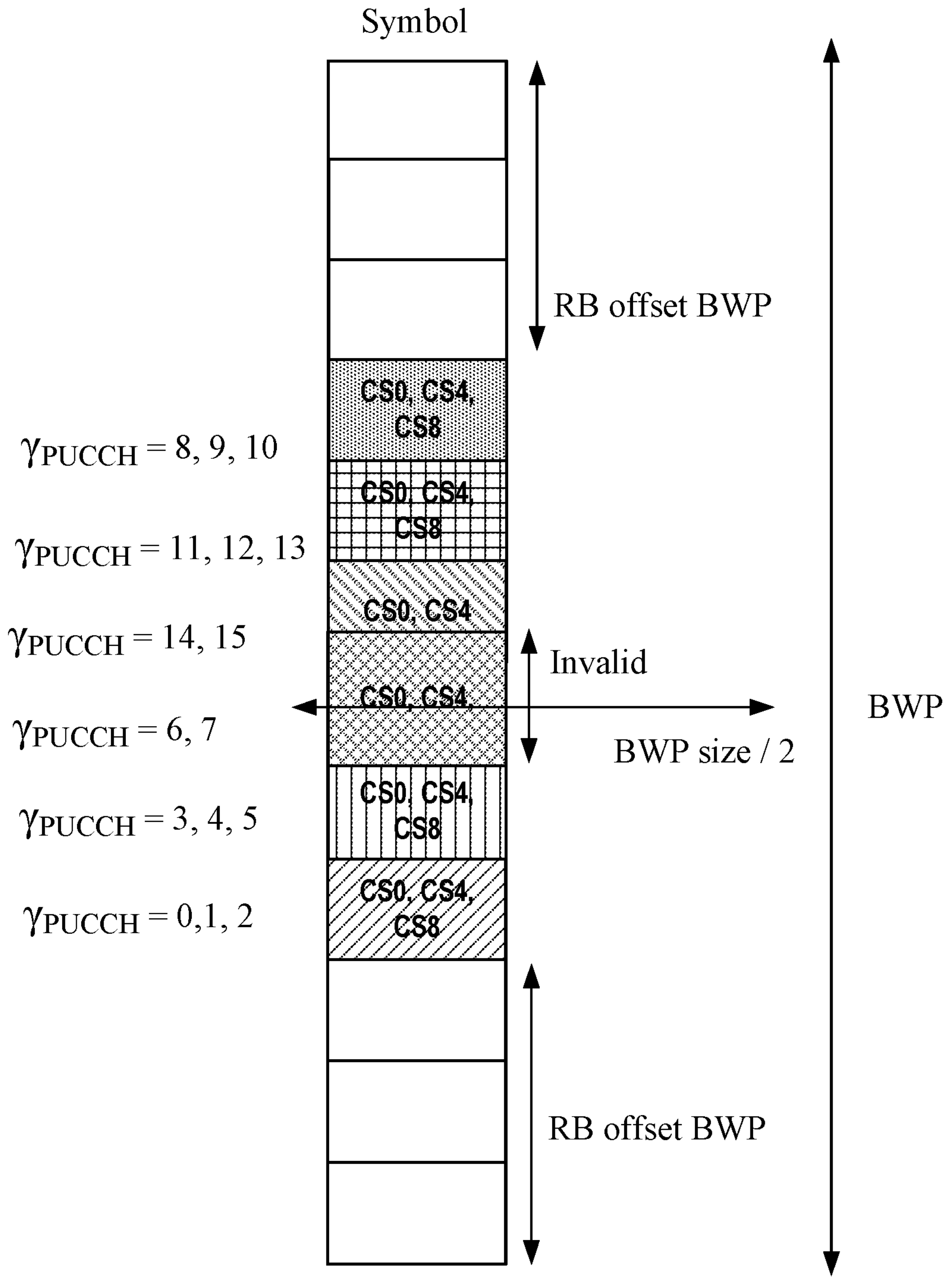
FIGS. 14 and 15 illustrate example invalidated PUCCH resources, in accordance with aspects of the present disclosure.
Figure 15:
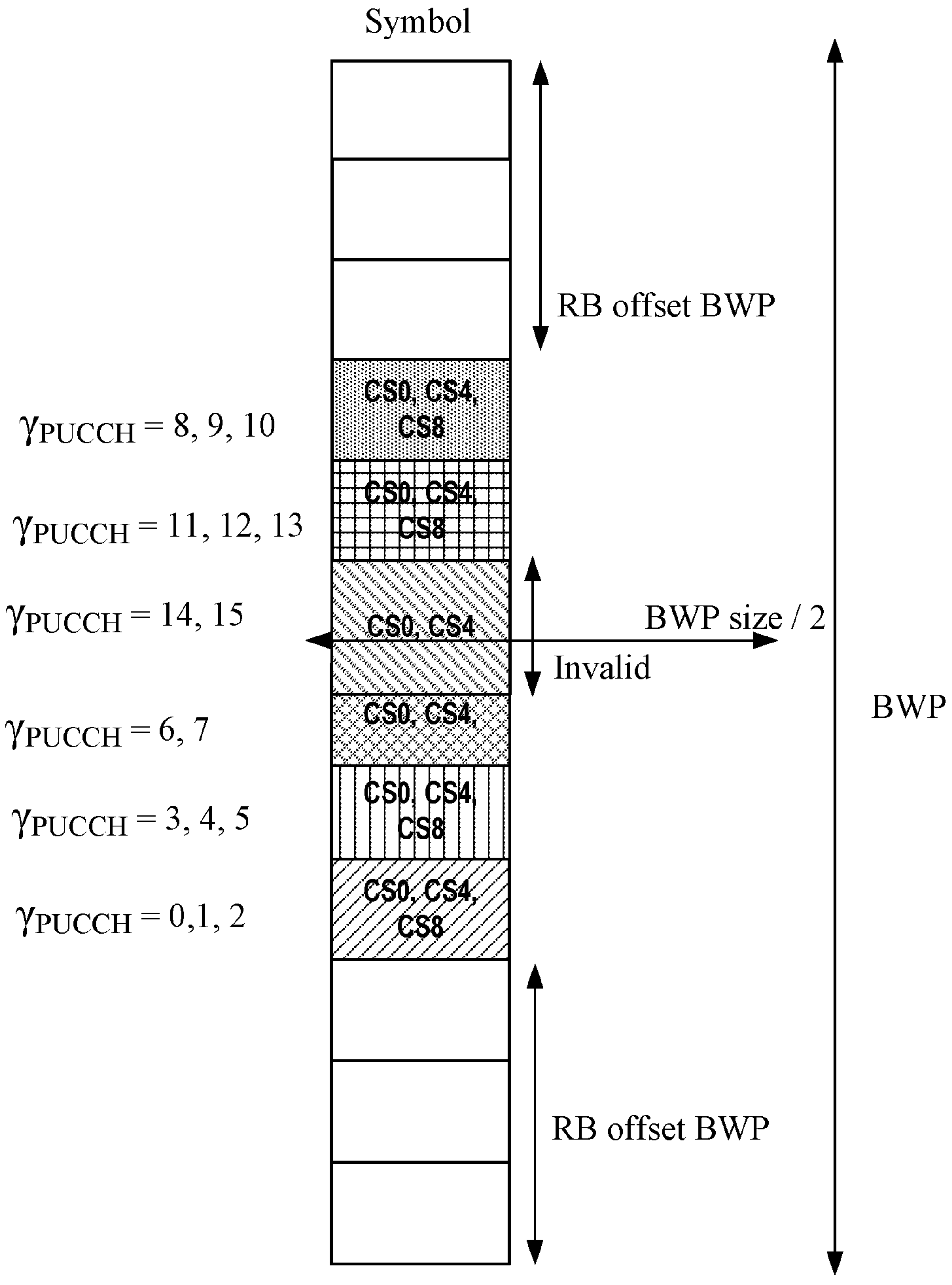

According to certain aspects, the number of RBs used for PUCCH transmission can lead to RB shortage. As discussed above, the UE can determine the first RB index in the first set of symbols from the Eq. 8 or Eq. 10, above, and the first RB index in the second set of symbols from the Eq. 9 or Eq. 11 above. Based on the determined index, certain resource group may be invalidated. For example, for $\gamma_{PUCCH}<8$, PUCCH resources that occupy RB(s) with an RB index larger than the index of the center RB of the system bandwidth $$(N_{BWP}^{size}/2)$$

are considered as invalid, as shown in FIG. 14. For $\gamma_{PUCCH}>8$, PUCCH resources that occupy RBs with an RB index smaller than $$(N_{BWP}^{size}/2)$$

are considered as invalid as shown in FIG. 15. Accordingly, the UE does not expect the network to indicate a PRI which corresponds to a $\gamma_{PUCCH}$ value that leads to an invalid resource and the network determines/sends PRI that corresponds to a $\gamma_{PUCCH}$ value that leads to valid resources. Further, the BS determines PRI, such that the PUCCH resources are valid.

According to certain aspects, PUCCH resources to invalidate can be determined by constructing all common PUCCH resource for $\gamma_{PUCCH}<8$ (e.g., allow the PUCCH resource to cross the middle of the UL BWP), and invalidating a common PUCCH resource only after it crosses the upper BWP boundary and for $\gamma_{PUCCH}\geq 8$ and invalidating a common PUCCH resources if it overlaps with an occupied resources by some common PUCCH resources with $\gamma_{PUCCH}<8$.

Figure 16:
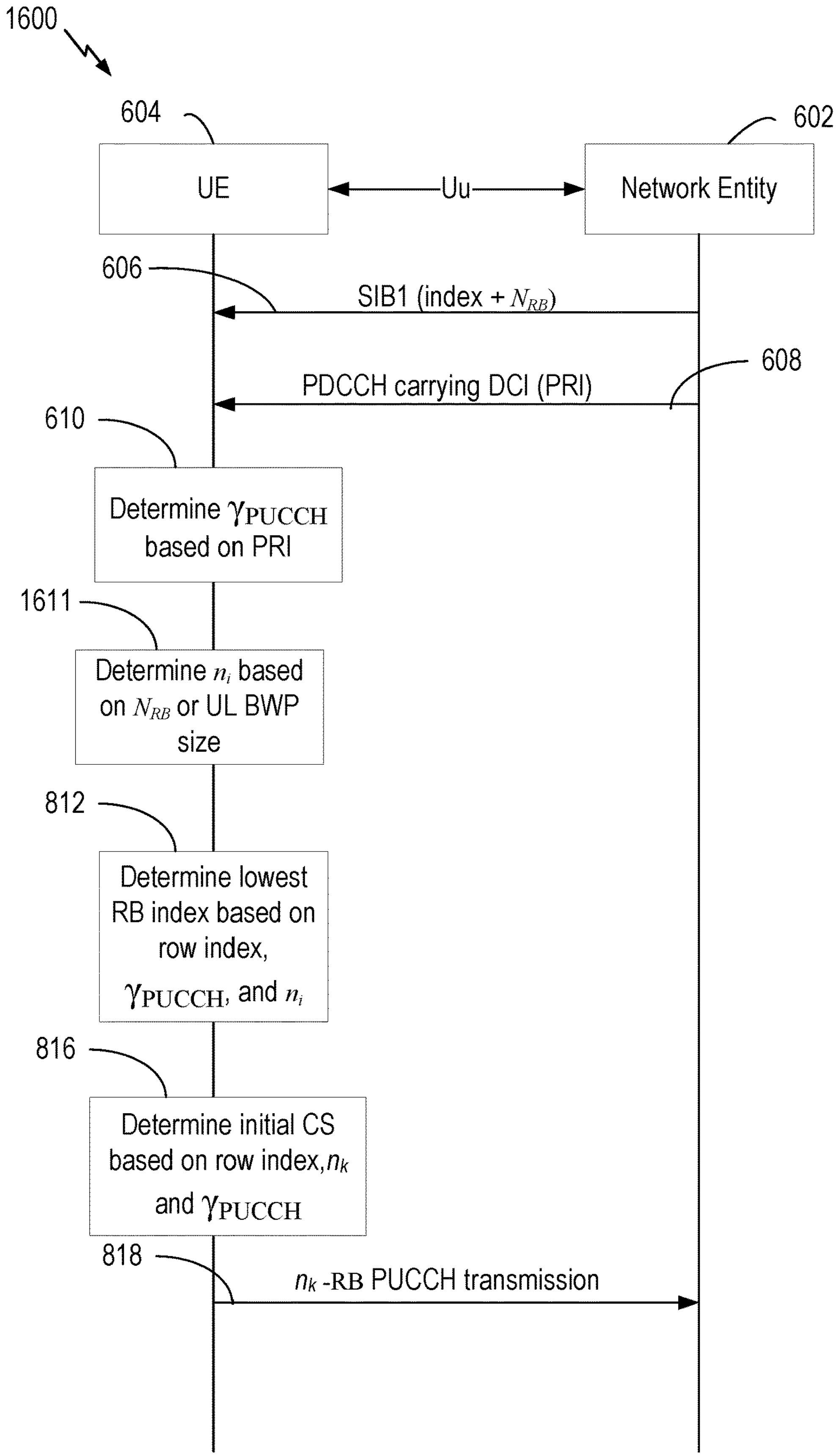
FIG. 16 is a call flow diagram illustrating example signaling for different numbers of RBs for UEs for a common PUCCH multi-RB resource, in accordance with aspects of the present disclosure.

FIG. 16 is a call flow diagram illustrating example operations and signaling 1600 for different numbers of RBs for UEs for a common PUCCH multi-RB resource, in accordance with aspects of the present disclosure. As shown in FIG. 16, UE 604 and network entity 602 may perform the steps 606, 608, and 610 as discussed above with respect to FIG. 6 and operations 812 and 818 as discussed above with respect to FIG. 8. However, at 1611, UE 604 derives the vector of RBs $n_i$ based on the signaled number of RBs parameter or the UL BWP size.

While aspects of the disclosure are described above with respect to determining a PUCCH resource set for a common multi-RB PUCCH format 0/1, the aspects may also be used to determine a PUCCH resource set for a dedicated multi-RB PUCCH format 0/1.

Figure 17:
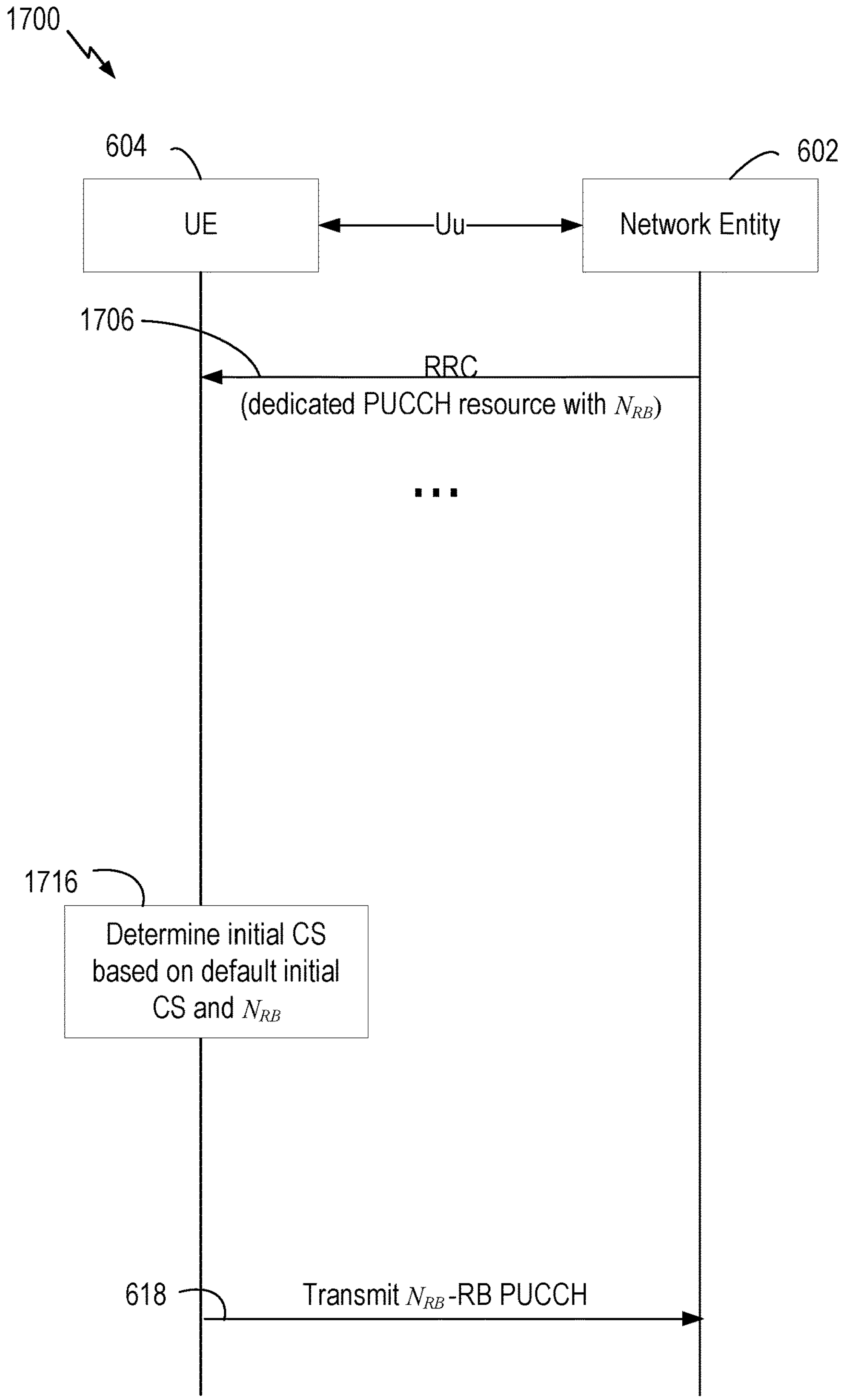
FIG. 17 is a call flow diagram illustrating example signaling for initial cyclic shift (CS) determination for a dedicated PUCCH multi-RB resource, in accordance with aspects of the present disclosure.

FIG. 17 is a call flow diagram illustrating example signaling 1700 for initial CS determination for a dedicated PUCCH multi-RB resource, in accordance with aspects of the present disclosure.

After successful initial access, the BS may configure dedicated PUCCH resources for a UE. As shown in FIG. 17, at 1706, network entity 602 sends RRC signaling to UE 604 configuring dedicated PUCCH resources. The configuration of each dedicated PUCCH resource may include a PUCCH format, a first symbol, a number of symbols, a starting PRB, a default initial CS, and a number of RBs parameter, $N_{RB}$, for PUCCH transmission.

The default initial CS may depend on channel condition between network entity 602 and UE 604. The default initial CS may be provided for 1-RB PUCCH. At 1716, UE 604 may determine an initial CS for uplink transmission using a dedicated PUCCH resource, based on the default initial CS provided network entity 602 and the $N_{RB}$ parameter. More specifically, if the default initial CS is m_0, and $N_{RB}$ is N, UE 604 may determine to use m_0*N as the initial CS for PUCCH transmission. At 618, UE 604 transmits the PUCCH transmission.

Figure 18:
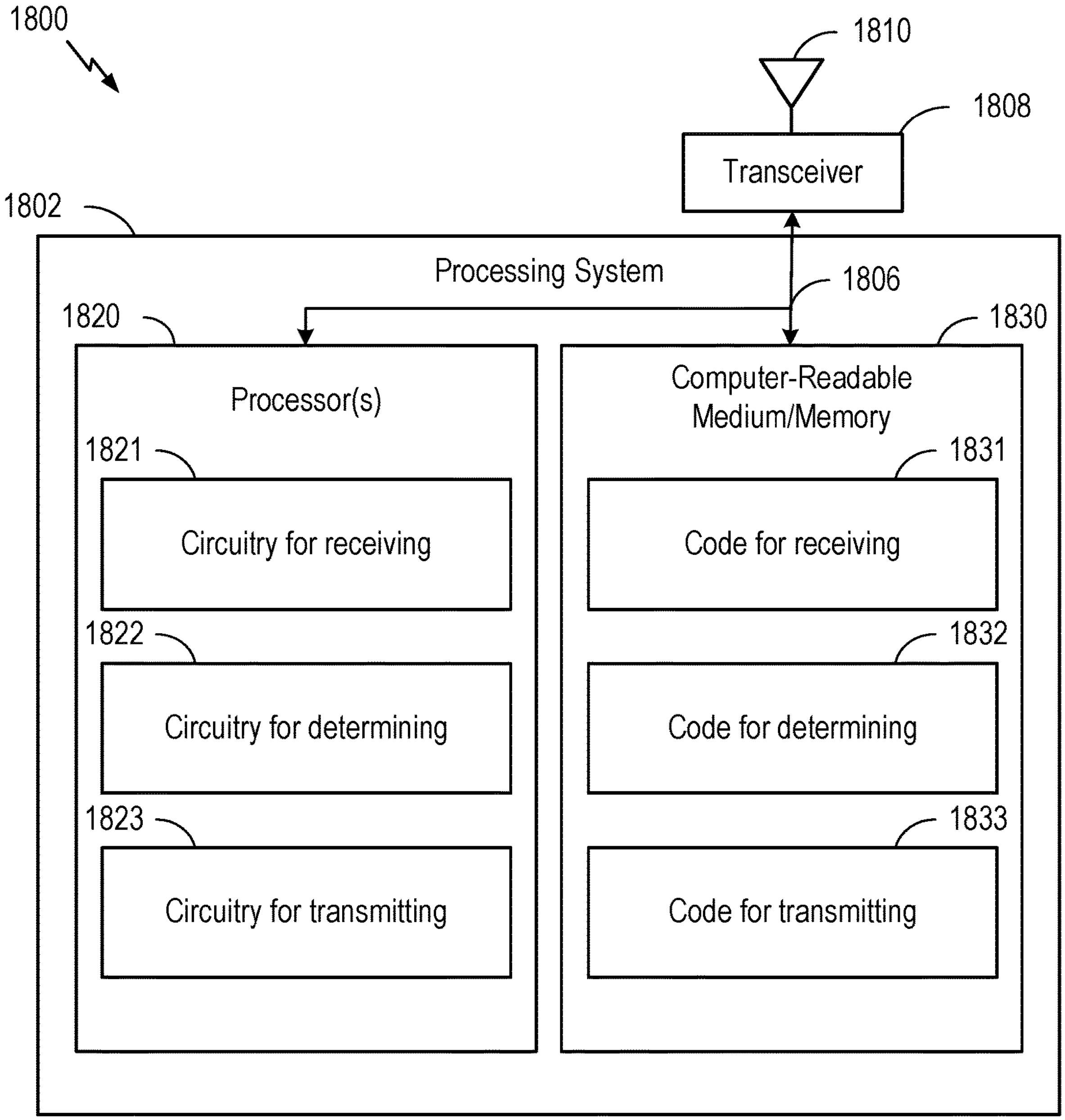
FIG. 18 illustrates an example communications device, in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIG. 12. The communications device 1800 includes a processing system 1802 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor(s) 1820 coupled to a computer-readable medium/memory 1830 via a bus 1806. In certain aspects, the computer-readable medium/memory 1830 is configured to store instructions (e.g., computer-executable code) that when executed by the processor(s) 1820, cause the processor(s) 1820 to perform the operations illustrated in FIG. 12, or other operations for performing the various techniques discussed herein. In certain aspects, computer-readable medium/memory 1830 stores code 1831 for receiving; code 1832 for determining; and code 1833 for transmitting. In certain aspects, the processor(s) 1820 has circuitry configured to implement the code stored in the computer-readable medium/memory 1830. The processor(s) 1820 includes circuitry 1821 for receiving; circuitry 1822 for determining; and circuitry 1823 for transmitting.

Figure 19:
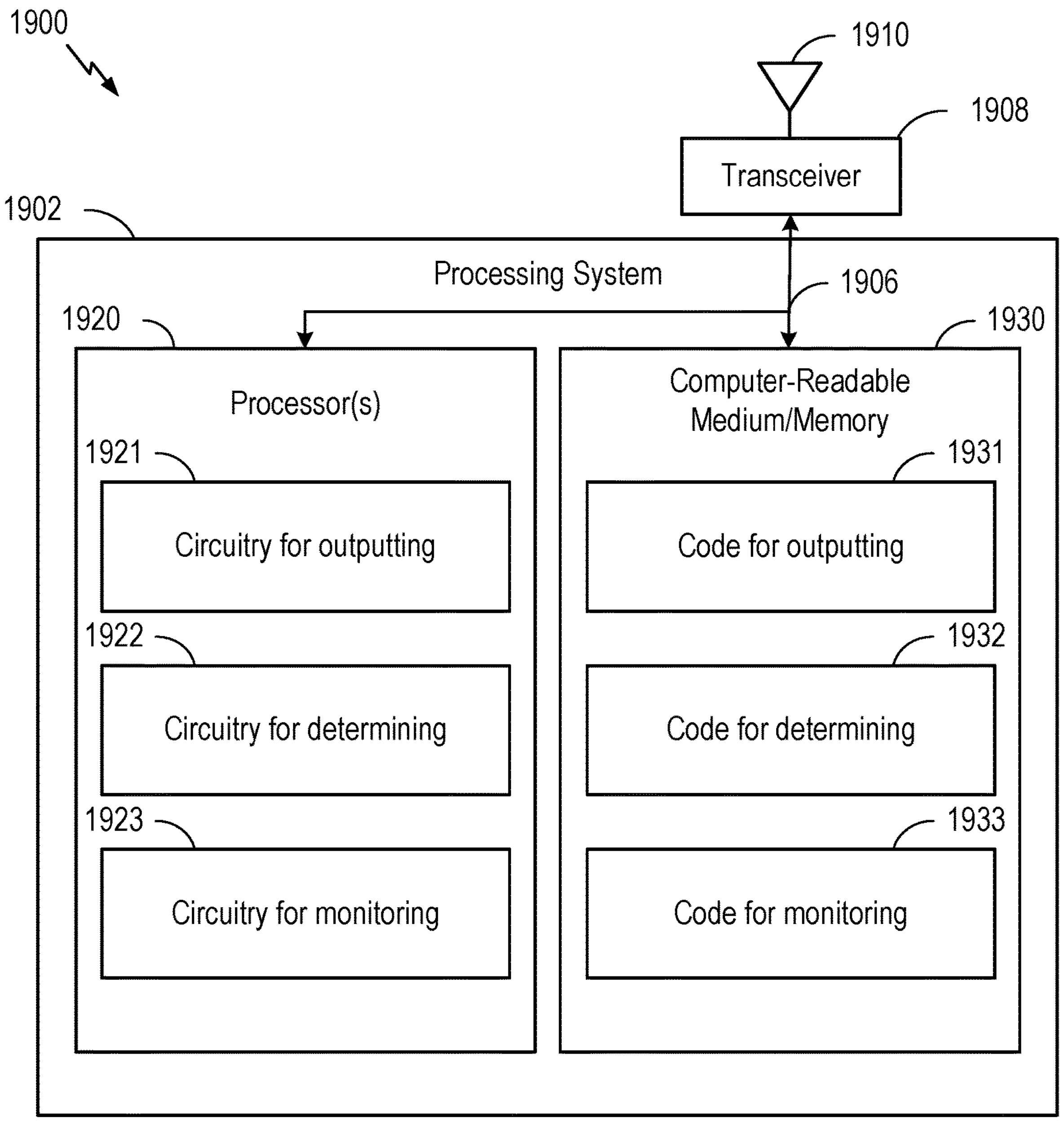
FIG. 19 illustrates another example communications device, in accordance with aspects of the present disclosure.

FIG. 19 illustrates a communications device 1900 that may include various components (e.g., corresponding to means-plus-function components) configured to perform operations for the techniques disclosed herein, such as the operations illustrated in FIG. 13. The communications device 1900 includes a processing system 1902 coupled to a transceiver 1908 (e.g., a transmitter and/or a receiver). The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes a processor(s) 1920 coupled to a computer-readable medium/memory 1930 via a bus 1906. In certain aspects, the computer-readable medium/memory 1930 is configured to store instructions (e.g., computer-executable code) that when executed by the processor(s) 1920, cause the processor(s) 1920 to perform the operations illustrated in FIG. 13, or other operations for performing the various techniques discussed herein. In certain aspects, computer-readable medium/memory 1930 stores code 1931 for outputting; code 1932 for determining; and code 1933 for monitoring. In certain aspects, the processor(s) 1920 has circuitry configured to implement the code stored in the computer-readable medium/memory 1930. The processor(s) 1920 includes circuitry 1921 for outputting; circuitry 1922 for determining; and circuitry 1923 for monitoring.

In some aspects, a processor may be configured to perform various operations, such as those associated with the methods described herein, and transmit (output) to or receive (obtain) data from another interface that is configured to transmit or receive, respectively, the data.

Example Aspects

In addition to the various aspects described above, the aspects can be combined. Some specific combinations of aspects are detailed below:

Aspect 1. A method for wireless communication by a user equipment (UE), comprising: receiving information from a base station (BS), the information indicating a physical uplink control channel (PUCCH) resource set and a number of resource blocks (RBs) parameter; receiving downlink control information (DCI) in a physical downlink control channel (PDCCH), the DCI containing a PUCCH resource indicator (PRI) field; determining a PUCCH resource from the PUCCH resource set for a PUCCH transmission, including: determining a PUCCH resource index based, at least in part, on the PRI; determining a number of RBs to use for the PUCCH transmission; determining a lowest RB index for the PUCCH transmission based, at least in part, on the determined PUCCH resource index and the number of RBs parameter; and determining an initial cyclic shift (CS) for the PUCCH transmission based, at least in part, on the determined PUCCH resource index and the number of RBs parameter; and transmitting the PUCCH transmission using the determined PUCCH resource.

Aspect 2. The method of aspect 1, wherein receiving the information comprises receiving a broadcast system information block (SIB) type 1 message containing: an index indicating a common resource set from a plurality of common resource sets; and the number of RBs parameter.

Aspect 3. The method of aspect 2, wherein the index points to a row in a table mapping to a PUCCH format, a first symbol, a number of symbols, a physical resource block (PRB) offset, and a set of initial CS indexes.

Aspect 4. The method of aspect 3, wherein determining the PUCCH resource index comprises determining $$\gamma_{PUCCH} = \left\lfloor \frac{2 * n_{CCE,0}}{N_{CCE,0}} \right\rfloor + 2 * \Delta_{PRI},$$

where $n_{CCE,0}$ is an index of a first control channel element (CCE) of the PDCCH, $N_{CCE,0}$ is a number of CCEs in a control resource set (CORESET) in which the PDCCH is detected, and $\Delta_{PRI}$ is a value of the PRI field in the DCI.

Aspect 5. The method of any of aspects 3-4, wherein the number of RBs parameter indicated in the information indicates a number of RBs for a multi-RB PUCCH format 0 transmission or a multi-RB PUCCH format 1 transmission.

Aspect 6. The method of aspect 5, wherein determining the lowest RB index is based on the determined PUCCH resource index, the PRB offset, a number of CSs in the set of initial CSs, and the indicated number of RBs for the multi-RB PUCCH transmission.

Aspect 7. The method of aspect 6, wherein determining the lowest RB index comprises determining a first lowest RB index in a first set of PUCCH symbols as $$RB_{BWP}^{offset} * N_{RB} + \left\lfloor \frac{\gamma_{PUCCH}}{N_{CS}} \right\rfloor * N_{RB}$$

and a second lowest RB index in a second set of PUCCH symbols as $$N_{BWP}^{size} - RB_{BWP}^{offset} * N_{RB} - \left( \left\lfloor \frac{\gamma_{PUCCH}}{N_{CS}} \right\rfloor + 1 \right) * N_{RB}$$

when $\gamma_{PUCCH}<8$ and determining the first lowest RB index in the first set of PUCCH symbols as $$N_{BWP}^{size} - RB_{BWP}^{offset} * N_{RB} - \left( \left\lfloor \frac{\gamma_{PUCCH-8}}{N_{CS}} \right\rfloor + 1 \right) * N_{RB}$$

and the second lowest RB index in the second set of PUCCH symbols as $$RB_{BWP}^{offset} * N_{RB} + \left\lfloor \frac{\gamma_{PUCCH-8}}{N_{CS}} \right\rfloor * N_{RB}$$

when $\gamma_{PUCCH} \geq 8$, where $$RB_{BWP}^{offset}$$

is the PRB offset, $\gamma_{PUCCH}$ is the determined PUCCH resource index, $N_{CS}$ is the number of CSs in the set of cyclic shifts, $$N_{BWP}^{size}$$

is a size of the configured bandwidth part (BWP), and $N_{RB}$ is the indicated number of RBs, wherein the first set of symbols comprises a first half of the number of symbols starting with a first symbol, and wherein the second set of symbols comprises a second half of the number of symbols Aspect 8. The method of aspect 7, further comprising determining to use $N_{RB}$ RBs for the PUCCH transmission.

Aspect 9. The method of aspect 8, further comprising determining the initial CS as $CS_i*N_{RB}$, where $CS_i$ is the i-th CS index from the set of initial CS indexes, and i is determined as $\gamma_{PUCCH}$ mod $N_{CS}$ when $\gamma_{PUCCH}<8$ and as $(\gamma_{PUCCH}-8)$ mod $N_{CS}$ when $\gamma_{PUCCH} \geq 8$.

Aspect 10. The method of any of aspects 3-9, wherein the number of RBs parameter indicated in the information indicates a plurality of numbers of RBs, $n_i=n_0, \ldots, n_{K-1}$ for a PUCCH format 0 transmission or a PUCCH format 1 transmission, and where the plurality of numbers of RBs are associated with an index k, where k is from 0 to K−1, where $$K = \left\lceil \frac{8}{N_{CS}} \right\rceil,$$

and where $N_{CS}$ is the number of CSs in the set of cyclic shifts.

Aspect 11. The method of aspect 10, further comprising: determining a value of the index k based on the determined PUCCH resource index and the number of CSs in the set of initial CSs; and determining a number of RBs to use for the multi-RB PUCCH transmission, $n_k$, based on the determined value of the index k.

Aspect 12. The method of aspect 11, wherein determining the value of the index k comprises determining $$k = \left\lfloor \frac{\gamma_{PUCCH}}{N_{CS}} \right\rfloor$$

when $\gamma_{PUCCH}<8$ and $$k = \left\lfloor \frac{\gamma_{PUCCH} - 8}{N_{CS}} \right\rfloor$$

when $\gamma_{PUCCH} \geq 8$, where $\gamma_{PUCCH}$ is the determined PUCCH resource index.

Aspect 13. The method of any of aspects 11-12, further comprising determining an RB offset parameter based on the index k.

Aspect 14. The method of aspect 13, wherein determining the RB offset parameter comprises determining $$RB_{offset,k}=\sum_{0}^{k-1}n_i.$$

Aspect 15. The method of any of aspects 13-14, wherein determining the lowest RB index is based on the determined PUCCH resource index, the PRB offset, a size of the configured bandwidth part (BWP), and the determined RB offset parameter.

Aspect 16. The method of any of aspects 13-15, wherein determining the lowest RB index comprises determining a first lowest RB index in a first set of PUCCH symbols as $$RB_{BWP}^{offset}*\left(\sum_{0}^{K-1}n_i\right)/K+RB_{offset,k}$$

and a second lowest RB index in a second set of PUCCH symbols as $$N_{BWP}^{size}-RB_{BWP}^{offset}*\left(\sum_{0}^{K-1}n_i\right)/K-RB_{offset,k}-n_k$$

when $\gamma_{PUCCH}<8$ and determining the first lowest RB index in the first set of PUCCH symbols as $$N_{BWP}^{size}-RB_{BWP}^{offset}*\left(\sum_{0}^{K-1}n_i\right)\Big/K-RB_{offset,k}-n_k$$

and the second lowest RB index in the second set of PUCCH symbols as $$RB_{BWP}^{offset}*\left(\sum_{0}^{K-1}n_i\right)\Big/K+RB_{offset,k}$$

when $\gamma_{PUCCH}\geq 8$, where $$RB_{BWP}^{offset}$$

is the PRB offset, $\gamma_{PUCCH}$ is the determined PUCCH resource index, $$N_{BWP}^{size}$$

is a size of the configured bandwidth part (BWP), and $RB_{offset,k}$ is the determined RB offset parameter, wherein the first set of symbols comprises a first half of the number of symbols starting with a first symbol, and wherein the second set of symbols comprises a second half of the number of symbols.

Aspect 17. The method of aspect 16, further comprising determining an initial CS as $CS_i*n_k$, where $CS_i$ is the i-th CS index from the set of initial CS indexes, and i is determined as ($\gamma_{PUCCH}$ mod $N_{CS}$) when $\gamma_{PUCCH}<8$ and as (($\gamma_{PUCCH}-8$) mod $N_{CS}$) when $\gamma_{PUCCH}\geq 8$.

Aspect 18. The method of any of aspect 2-17, further comprising negotiating an actual number of RBs with the BS for the PUCCH transmission.

Aspect 19. The method of aspect 18, wherein the actual number of RBs is equal to or smaller than the indicated number of RBs.

Aspect 20. The method of any of aspect 1-19, wherein the UE is configured to communicate in a 52.6 GHz to 71 GHz bandwidth.

Aspect 21. The method of any of aspect 2-20, wherein the PUCCH resource is a common PUCCH resource is used for PUCCH transmission before dedicated radio resource control (RRC) configuration.

Aspect 22. The method of any of aspect 1-21, wherein: the PUCCH resource set is a dedicated PUCCH resource set; each PUCCH resource of the dedicated PUCCH resource set includes at least a PUCCH format, a first symbol, a number of symbols, a starting physical RB (PRB), and a default initial CS; and the indicated number of RBs parameter, $N_{RB}$, is provided for each PUCCH resource of the dedicated PUCCH resource set, wherein at least some of the PUCCH resources are provided with a different value of $N_{RB}$.

Aspect 23. The method of aspect 22, wherein the information is provided via radio resource control (RRC) signaling.

Aspect 24. The method of any of aspects 22-23, wherein determining the initial CS comprises determining the initial CS as the default initial CS scaled by $N_{RB}$.

Aspect 25. The method any of aspects 3-24, further comprising deriving a plurality of numbers of RBs, $n_i=n_0$, $n_1$, . . . , $n_{K-1}$ for a PUCCH format 0 transmission or a PUCCH format 1 transmission, where the plurality of numbers of RBs are associated with an index k, where k is from 0 to K−1, where $$K=\left\lceil\frac{8}{N_{CS}}\right\rceil,$$

where $N_{CS}$ is the number of CSs in the set of cyclic shifts, and wherein the deriving is based on the signaled number of RBs parameter, and a size of a system bandwidth.

Aspect 26. The method of aspect 25, wherein the derivation is hardcoded according to a wireless standard.

Aspect 27. The method of any of aspects 25-26, wherein deriving the plurality of numbers of RBs comprises deriving a first number of PUCCH resources that use one RB and a second number of PUCCH resources that uses the signaled number of RBs, where the first number of PUCCH resources and the second number of PUCCH resources includes 2*K resources.

Aspect 28. The method of any of aspects 2-27, further comprising determining one or more invalid PUCCH resources in the resource set.

Aspect 29. The method of aspect 28, wherein determining the one or more invalid PUCCH resources comprises: for a PUCCH resource index smaller than eight, determining PUCCH resources as invalid that occupies a RB with an index larger than the index of the center RB of the system bandwidth; and for a PUCCH resource index equal to or larger than eight, determining PUCCH resources as invalid that occupies a RB with index smaller than the index of the center RB of the system bandwidth.

Aspect 30. The method of aspect 29, wherein determining the one or more invalid PUCCH resources comprises: for a PUCCH resource index smaller than eight, determining PUCCH resources as valid; and for a PUCCH resource index equal to or larger than eight, determining PUCCH resources as invalid that have an RB occupied by the PUCCH resource having an index smaller than the index of the center RB of the system bandwidth and overlap with an occupied PUCCH resource with a PUCCH resource index smaller than eight.

Aspect 31. A method for wireless communication by a network entity, comprising: outputting information to one or more user equipments (UEs), the information indicating a physical uplink control channel (PUCCH) resource set and a number of resource blocks (RBs) parameter; sending downlink control information (DCI) in a physical downlink control channel (PDCCH), the DCI containing a PUCCH resource indicator (PRI) field; determining a PUCCH resource from the PUCCH resource set for a PUCCH transmission, including: determining a PUCCH resource index based, at least in part, on the PRI; determining a number of RBs to monitor for the PUCCH transmission; determining a lowest RB index for the PUCCH transmission based, at least in part, on the determined PUCCH resource index and the number of RBs parameter; and determining an initial cyclic shift (CS) for the PUCCH transmission based, at least in part, on the determined PUCCH resource index and the number of RBs parameter; and monitoring for the PUCCH transmission using the determined PUCCH resource.

Aspect 32. The method of aspect 31, wherein sending the information comprises broadcasting a system information block (SIB) type 1 message containing: an index indicating the PUCCH resource set from a plurality of PUCCH resource set; and the number of RBs parameter.

Aspect 33. The method of any of aspects 31-32, wherein the index points to a row in a table mapping to a PUCCH format, a first symbol, a number of symbols, a physical resource block (PRB) offset, and a set of initial CS indexes.

Aspect 34. The method of aspect 33, wherein determining the PUCCH resource index comprises determining $$\gamma_{PUCCH} = \left\lfloor \frac{2 * n_{CCE,0}}{N_{CCE,0}} \right\rfloor + 2 * \Delta_{PRI},$$

where $n_{CCE,0}$ is an index of a first control channel element (CCE) of the PDCCH, $N_{CCE,0}$ is a number of CCEs in a control resource set (CORESET) in which the PDCCH is detected, and $\Delta_{PRI}$ is a value of the PRI field in the DCI.

Aspect 35. The method of any of aspects 33-34, wherein the number of RBs parameter indicated in the information indicates a number of RBs for a multi-RB PUCCH format 0 transmission or a multi-RB PUCCH format 1 transmission.

Aspect 36. The method of aspect 35, wherein determining the lowest RB index is based on the determined PUCCH resource index, the PRB offset, a number of CSs in the set of initial CSs, and the indicated number of RBs for the multi-RB PUCCH transmission.

Aspect 37. The method of aspect 36, wherein determining the lowest RB index comprises determining a first lowest RB index in a first set of PUCCH symbols as $$RB_{BWP}^{offset} * N_{RB} + \left\lfloor \frac{\gamma_{PUCCH}}{N_{CS}} \right\rfloor * N_{RB}$$

and a second lowest RB index in a second set of PUCCH symbols as $$N_{BWP}^{size} - RB_{BWP}^{offset} * N_{RB} - \left( \left\lfloor \frac{\gamma_{PUCCH}}{N_{CS}} \right\rfloor + 1 \right) * N_{RB}$$

when $\gamma_{PUCCH}<8$ and determining the first lowest RB index in the first set of PUCCH symbols as $$N_{BWP}^{size} - RB_{BWP}^{offset} * N_{RB} - \left( \left\lfloor \frac{\gamma_{PUCCH} - 8}{N_{CS}} \right\rfloor + 1 \right) * N_{RB}$$

and the second lowest RB index in the second set of PUCCH symbols as $$RB_{BWP}^{offset} * N_{RB} + \left\lfloor \frac{\gamma_{PUCCH} - 8}{N_{CS}} \right\rfloor * N_{RB}$$

when $\gamma_{PUCCH} \geq 8$, where $$RB_{BWP}^{offset}$$

is the PRB offset, $\gamma_{PUCCH}$ is the determined PUCCH resource index, $N_{CS}$ is the number of CSs in the set of cyclic shifts, $$N_{BWP}^{size}$$

is a size of the configured bandwidth part (BWP), and $N_{RB}$ is the indicated number of RBs, wherein the first set of symbols comprises a first half of the number of symbols starting with a first symbol, and wherein the second set of symbols comprises a second half of the number of symbols.

Aspect 38. The method of aspect 37, further comprising determining to monitor $N_{RB}$ RBs for the PUCCH transmission.

Aspect 39. The method of aspect 38, further comprising determining the initial CS as $CS_i * N_{RB}$, where $CS_i$ is the i-th CS index from the set of initial CS indexes, and i is determined as ($\gamma_{PUCCH}$ mod $N_{CS}$) when $\gamma_{PUCCH}<8$ and as ($\gamma_{PUCCH}-8$) mod $N_{CS}$ when $\gamma_{PUCCH} \geq 8$.

Aspect 40. The method of any of aspects 33-39, wherein the number of RBs parameter indicated in the information indicates a plurality of numbers of RBs, $n_i$, $=n_0, n_1, \ldots, n_{K-1}$ for a PUCCH format 0 transmission or a PUCCH format 1 transmission, and wherein the plurality of numbers of RBs are associated with an index k, where k is from 0 to K−1, where $$K = \left\lceil \frac{8}{N_{CS}} \right\rceil,$$

and where $N_{CS}$ is the number of CSs in the set of cyclic shifts.

Aspect 41. The method of aspect 40, further comprising: determining a value of the index k based on the determined PUCCH resource index and the number of CSs in the set of initial CSs; and determining a number of RBs to monitor for the multi-RB PUCCH transmission, $n_k$, based on the determined value of the index k.

Aspect 42. The method of aspect 41, wherein determining the value of the index k comprises determining $$k = \left\lfloor \frac{\gamma_{PUCCH}}{N_{CS}} \right\rfloor$$

when $\gamma_{PUCCH}<8$ and $$k = \left\lfloor \frac{\gamma_{PUCCH}-8}{N_{CS}} \right\rfloor$$

when $\gamma_{PUCCH}\geq 8$, where $\gamma_{PUCCH}$ is the determined PUCCH resource index.

Aspect 43. The method of any of aspects 40-41, further comprising determining an RB offset parameter based on the index k.

Aspect 44. The method of aspect 43, wherein determining the RB offset parameter comprises determining $$RB_{offset,k} = \sum\nolimits_{0}^{k-1} n_i.$$

Aspect 45. The method of any of aspects 43-44, wherein determining the lowest RB index is based on the determined PUCCH resource index, the PRB offset, a size of the configured bandwidth part (BWP), and the determined RB offset parameter.

Aspect 46. The method of any of aspects 43-45, wherein determining the lowest RB index comprises determining a first lowest RB index in a first set of PUCCH symbols as $$RB_{BWP}^{offset} * \left(\sum\nolimits_{0}^{K-1} n_i\right) \Big/ K + RB_{offset,k}$$

and a second lowest RB index in a second set of PUCCH symbols as $$N_{BWP}^{size} - RB_{BWP}^{offset} * \left(\sum\nolimits_{0}^{K-1} n_i\right) \Big/ K - RB_{offset,k} - n_k$$

when $\gamma_{PUCCH}<8$ and determining the first lowest RB index in the first set of PUCCH symbols as $$N_{BWP}^{size} - RB_{BWP}^{offset} * \left(\sum\nolimits_{0}^{K-1} n_i\right) \Big/ K - RB_{offset,k} - n_k$$

and the second lowest RB index in the second set of PUCCH symbols as $$RB_{BWP}^{offset} * \left(\sum\nolimits_{0}^{K-1} n_i\right) \Big/ K - RB_{offset,k}$$

when $\gamma_{PUCCH}\geq 8$, where $$RB_{BWP}^{offset}$$

is the PRB offset, $\gamma_{PUCCH}$ is the determined PUCCH resource index, $$N_{BWP}^{size}$$

is a size of the configured bandwidth part (BWP), and $RB_{offset,k}$ is the determined RB offset parameter, wherein the first set of symbols comprises a first half of the number of symbols starting with a first symbol, and wherein the second set of symbols comprises a second half of the number of symbols.

Aspect 47. The method of aspect 46, further comprising determining the initial CS as $CS_i*n_k$, where $CS_i$ is the i-th CS index from the set of initial CS indexes, and i is determined as ($\gamma_{PUCCH}$ mod $N_{CS}$) when $\gamma_{PUCCH}<8$ and as (($\gamma_{PUCCH}-8$) mod $N_{CS}$) when $\gamma_{PUCCH}\geq 8$.

Aspect 48. The method of any of aspects 31-47, further comprising negotiating an actual number of RBs with the UE for the PUCCH transmission.

Aspect 49. The method of aspect 48, wherein the actual number of RBs is equal to or smaller than the indicated number of RBs.

Aspect 50. The method of any of aspects 31-49, wherein the UE is configured to communicate in a 52.6 GHz to 71 GHz bandwidth.

Aspect 51. The method of any of aspects 31-50, wherein the PUCCH resource is a common PUCCH resource used for PUCCH transmission before dedicated radio resource control (RRC) configuration.

Aspect 52. The method of any of aspects 31-51, wherein: the PUCCH resource set is a dedicated PUCCH resource set; each PUCCH resource of the dedicated PUCCH resource set includes at least a PUCCH format, a first symbol, a number of symbols, a starting physical RB (PRB), and a default initial CS; and the indicated number of RBs parameter, $N_{RB}$, is provided for each PUCCH resource of the dedicated PUCCH resource set, wherein at least some of the PUCCH resources are provided with a different value of $N_{RB}$.

Aspect 53. The method of aspect 52, wherein the information is provided via radio resource control (RRC) signaling.

Aspect 54. The method of any of aspects 52-53, wherein determining the initial CS comprises determining the initial CS as the default initial CS scaled by $N_{RB}$.

Aspect 55. The method of any of aspects 31-54, further comprising determining the PRI such that: for a PUCCH resource index smaller than eight, any RB used by the PUCCH resource has an index equal to smaller than the index of the center RB of a system bandwidth; and for a PUCCH resource index equal to or larger than eight, any RB used by the PUCCH resource has an index equal to or larger than the index of the center RB of the system bandwidth.

Aspect 56. The method of any of aspects 31-55, further comprising determining the PRI such that: for a PUCCH resource index smaller than eight, determining PUCCH resources as valid; and for a PUCCH resource index equal to or larger than eight, determining PUCCH resources as invalid that some RB used by the PUCCH resource having an index smaller than the index of the center RB of the system bandwidth and overlap with an occupied PUCCH resource with a PUCCH resource index smaller than eight.

Aspect 57. A method for wireless communication by a user equipment (UE), comprising: receiving information indicating a physical uplink control channel (PUCCH) resource set and a number of resource blocks (RBs) parameter; receiving downlink control information (DCI) in a physical downlink control channel (PDCCH), the DCI containing a PUCCH resource indicator (PRI); determining a PUCCH resource from the PUCCH resource set for a PUCCH transmission, wherein the determining includes: determining a PUCCH resource index based, at least in part, on the PRI; determining a lowest RB index for the PUCCH transmission based, at least in part, on the PUCCH resource index and the number of RBs parameter; and determining an initial cyclic shift (CS) for the PUCCH transmission based, at least in part, on the PUCCH resource index and the number of RBs parameter; and transmitting the PUCCH transmission using the PUCCH resource.

Aspect 58. The method of any aspect 57, wherein receiving the information comprises receiving a broadcast system information block (SIB) type 1 message containing: an index indicating a common resource set from a plurality of common resource sets; and the number of RBs parameter.

Aspect 59. The method of aspect 58, wherein the index points to a row in a table mapping to a PUCCH format for the PUCCH transmission, a first symbol for the PUCCH transmission, a number of symbols for the PUCCH transmission, a physical resource block (PRB) offset for the PUCCH transmission, and a set of initial CS indexes for the PUCCH transmission.

Aspect 60. The method of aspect 59, wherein determining the PUCCH resource index comprises determining $$\gamma_{PUCCH} = \left\lfloor \frac{2 * n_{CCE,0}}{N_{CCE,0}} \right\rfloor + 2 * \Delta_{PRI},$$

where $n_{CCE,0}$ is an index of a first control channel element (CCE) of the PDCCH, $N_{CCE,0}$ is a number of CCEs in a control resource set (CORESET) in which the PDCCH is detected, and $\Delta_{PRI}$ is a value of the PRI in the DCI.

Aspect 61. The method of any combination of aspects 59-60, wherein the number of RBs parameter indicates a number of RBs for a multiple RB PUCCH format 0 transmission or a multiple RB PUCCH format 1 transmission.

Aspect 62. The method of aspect 61, wherein determining the lowest RB index is based on the PUCCH resource index, the PRB offset, a number of CSs in the set of initial CSs, and the number of RBs for the multiple RB PUCCH transmission.

Aspect 63. The method of aspect 62, wherein determining the lowest RB index comprises: determining a first lowest RB index in a first set of PUCCH symbols as $$RB_{BWP}^{offset} * N_{RB} + \left\lfloor \frac{\gamma_{PUCCH}}{N_{CS}} \right\rfloor * N_{RB}$$

and a second lowest RB index in a second set of PUCCH symbols as $$N_{BWP}^{size} - RB_{BWP}^{offset} * N_{RB} - \left( \left\lfloor \frac{\gamma_{PUCCH}}{N_{CS}} \right\rfloor + 1 \right) * N_{RB}$$

when $\gamma_{PUCCH}<8$; and determining the first lowest RB index in the first set of PUCCH symbols as $$N_{BWP}^{size} - RB_{BWP}^{offset} * N_{RB} - \left( \left\lfloor \frac{\gamma_{PUCCH-8}}{N_{CS}} \right\rfloor + 1 \right) * N_{RB}$$

and the second lowest RB index in the second set of PUCCH symbols as $$RB_{BWP}^{offset} * N_{RB} + \left\lfloor \frac{\gamma_{PUCCH-8}}{N_{CS}} \right\rfloor * N_{RB}$$

when $\gamma_{PUCCH} \geq 8$, wherein $$RB_{BWP}^{offset}$$

is the PRB offset, $\gamma_{PUCCH}$ is the PUCCH resource index, $N_{CS}$ is the number of CSs in the set of cyclic shifts, $$N_{BWP}^{size}$$

is a size of the configured bandwidth part (BWP), and $N_{RB}$ is a number of RBs indicated by the number of RBs parameter, wherein the first set of symbols comprises a first half of the number of symbols starting with the first symbol, and wherein the second set of symbols comprises a second half of the number of symbols.

Aspect 64. The method of aspect 63, further comprising determining to use $N_{RB}$ RBs for the PUCCH transmission.

Aspect 65. The method of aspect 64, further comprising: determining the initial CS as $CS_i * N_{RB}$, wherein $CS_i$ is the i-th CS index from the set of initial CS indexes, and wherein i is determined as $\gamma_{PUCCH}$ mod $N_{CS}$ when $\gamma_{PUCCH}<8$ and as $(\gamma_{PUCCH}-8)$ mod $N_{CS}$ when $\gamma_{PUCCH} \geq 8$.

Aspect 66. The method of any combination of aspects 58-65, further comprising determining one or more invalid PUCCH resources in the PUCCH resource set.

Aspect 67. The method of aspect 66, wherein determining the one or more invalid PUCCH resources comprises: for a PUCCH resource index smaller than eight, determining PUCCH resources as invalid that occupy a RB with an index larger than the index of a center RB of a system bandwidth; and for a PUCCH resource index equal to or larger than eight, determining PUCCH resources as invalid that occupy a RB with an index smaller than the index of the center RB of the system bandwidth.

Aspect 68. The method of aspect 67, wherein determining the one or more invalid PUCCH resources comprises: for a PUCCH resource index smaller than eight, determining PUCCH resources as valid; and for a PUCCH resource index equal to or larger than eight, determining PUCCH resources as invalid that have an RB occupied by the PUCCH resource having an index smaller than the index of the center RB of the system bandwidth and overlap with an occupied PUCCH resource with a PUCCH resource index smaller than eight.

Aspect 69. The method of any combination of aspects 59-68, wherein the number of RBs parameter indicated in the information indicates a plurality of numbers of RBs, $n_i=n_0, n_1, \ldots, n_{K-1}$ for a PUCCH format 0 transmission or a PUCCH format 1 transmission, and wherein the plurality of numbers of RBs are associated with an index k, where k is from 0 to K−1, where $$K = \left\lceil \frac{8}{N_{CS}} \right\rceil,$$

and where $N_{CS}$ is a number of CSs in the set of cyclic shifts.

Aspect 70. The method of aspect 69, further comprising: determining a value of the index k based on the PUCCH resource index and the number of CSs in the set of initial CSs; and determining a number of RBs to use for the multi-RB PUCCH transmission, $n_k$, based on the value of the index k.

Aspect 71. The method of any combination of aspects 69-70, wherein determining the value of the index k comprises: determining $$k = \left\lfloor \frac{\gamma_{PUCCH}}{N_{CS}} \right\rfloor$$

when $\gamma_{PUCCH}<8$; and determining $$k = \left\lfloor \frac{\gamma_{PUCCH} - 8}{N_{CS}} \right\rfloor$$

when $\gamma_{PUCCH} \geq 8$, where $\gamma_{PUCCH}$ is the PUCCH resource index.

Aspect 72. The method of any combination of aspects 70-71, further comprising determining an RB offset parameter based on the index k.

Aspect 73. The method of aspect 72, wherein determining the RB offset parameter comprises determining $$RB_{offset,k} = \sum_0^{k-1} n_i.$$

Aspect 74. The method of any combination of aspects 72-73, wherein determining the lowest RB index is based on the PUCCH resource index, the PRB offset, a size of the configured bandwidth part (BWP), and the RB offset parameter.

Aspect 75. The method of any combination of aspects 72-74, wherein determining the lowest RB index comprises: determining a first lowest RB index in a first set of PUCCH symbols as $$RB_{BWP}^{offset} * \left(\sum_0^{K-1} n_i\right)/K + RB_{offset,k}$$

and a second lowest RB index in a second set of PUCCH symbols as $$N_{BWP}^{size} - RB_{BWP}^{offset} * \left(\sum_0^{K-1} n_i\right)/K - RB_{offset,k} - n_k$$

when $\gamma_{PUCCH}<8$; and determining the first lowest RB index in the first set of PUCCH symbols as $$N_{BWP}^{size} - RB_{BWP}^{offset} * \left(\sum_0^{K-1} n_i\right)/K - RB_{offset,k} - n_k$$

and the second lowest RB index in the second set of PUCCH symbols as $$RB_{BWP}^{offset} * \left(\sum_0^{K-1} n_i\right)/K + RB_{offset,k}$$

when $\gamma_{PUCCH} \geq 8$, wherein $$RB_{BWP}^{offset}$$

is the PRB offset $\gamma_{PUCCH}$ is the PUCCH resource index, $$N_{BWP}^{size}$$

is a size of the configured bandwidth part (BWP), and $RB_{offset,k}$ is the RB offset parameter, wherein the first set of symbols comprises a first half of the number of symbols starting with the first symbol, and wherein the second set of symbols comprises a second half of the number of symbols.

Aspect 76. The method of aspect 75, further comprising: determining an initial CS as $CS_i * n_k$, wherein $CS_i$ is the i-th CS index from the set of initial CS indexes, and wherein i is $\gamma_{PUCCH}$ mod $N_{CS}$ when $\gamma_{PUCCH}<8$ and as (($\gamma_{PUCCH}-8$) mod $N_{CS}$) when $\gamma_{PUCCH} \geq 8$.

Aspect 77. The method of any combination of aspects 58-76, wherein the PUCCH resource is a common PUCCH resource is used for PUCCH transmission before dedicated radio resource control (RRC) configuration.

Aspect 78. The method of any combination of aspects 57-77, wherein: the PUCCH resource set is a dedicated PUCCH resource set; each PUCCH resource of the dedicated PUCCH resource set includes at least a PUCCH format, a first symbol, a number of symbols, a starting physical RB (PRB), and a default initial CS; the number of RBs parameter is provided for each PUCCH resource of the dedicated PUCCH resource set; and at least some of the PUCCH resources are provided with a different value of the number of RBs parameter.

Aspect 79. The method of aspect 78, wherein determining the initial CS comprises determining the initial CS as the default initial CS scaled by $N_{RB}$.

Aspect 80. The method any combination of aspects 59-79, further comprising: deriving a plurality of numbers of RBs, $n_i = n_0, n_1, \ldots, n_{K-1}$ for a PUCCH format 0 transmission or a PUCCH format 1 transmission, wherein the plurality of numbers of RBs are associated with an index k, wherein k is from 0 to K−1, where $$K = \left\lceil \frac{8}{N_{CS}} \right\rceil,$$

wherein $N_{CS}$ is the number of CSs in the set of cyclic shifts, and wherein the deriving is based on the number of RBs parameter and a size of a system bandwidth.

Aspect 81. A method for wireless communication, comprising: outputting information indicating a physical uplink control channel (PUCCH) resource set and a number of resource blocks (RBs) parameter; outputting downlink control information (DCI) containing a PUCCH resource indicator (PRI); determining a PUCCH resource from the PUCCH resource set for a PUCCH transmission, wherein the determining includes: determining a PUCCH resource index based, at least in part, on the PRI; determining a lowest RB index for the PUCCH transmission based, at least in part, on the PUCCH resource index and the number of RBs parameter; and determining an initial cyclic shift (CS) for the PUCCH transmission based, at least in part, on the PUCCH resource index and the number of RBs parameter; and monitoring for the PUCCH transmission using the PUCCH resource.

Aspect 82. The method of aspect 81, wherein the index points to a row in a table mapping to a PUCCH format for the PUCCH transmission, a first symbol for the PUCCH transmission, a number of symbols for the PUCCH transmission, a physical resource block (PRB) offset for the PUCCH transmission, and a set of initial CS indexes for the PUCCH transmission.

Aspect 83. The method of aspect 82, wherein the number of RBs parameter indicates a number of RBs for a multiple RB PUCCH format 0 transmission or a multiple RB PUCCH format 1 transmission.

Aspect 84. The method of aspects 83, wherein determining the lowest RB index is based on the PUCCH resource index, the PRB offset, a number of CSs in the set of initial CSs, and the number of RBs for the multiple RB PUCCH transmission.

Aspect 85. An apparatus comprising means for performing the method of any of aspects 1 through 84.

Aspect 86. An apparatus comprising at least one processor and a memory coupled to the at least one processor, the memory comprising code executable by the at least one processor to cause the apparatus to perform the method of any of aspects 1 through 84.

Aspect 87. A computer readable medium storing computer executable code thereon for wireless communications that, when executed by at least one processor, cause an apparatus to perform the method of any of aspects 1 through 84.

Additional Wireless Communication Network Aspects

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements. In addition, these service may co-exist in the same subframe.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). ABS for a macro cell may be referred to as a macro BS. ABS for a pico cell may be referred to as a pico BS. ABS for a femto cell may be referred to as a femto BS or a home BS.

BS 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with core network 190 through second backhaul links 184. BSs 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs, such as BS 180 may operate in a traditional sub-6 GHz spectrum, in millimeter wave (mmWave) frequencies, and/or near mmWave frequencies in communication with the UE 104. When BS 180 operates in mmWave or near mmWave frequencies, the BS 180 may be referred to as an mmWave BS.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (a-RAN) or Virtualized RAN (VRAN) architecture.

The communication links 120 between BSs 102 and, for example, UEs 104, may be through one or more carriers. For example, BSs102 and UEs 104 may use spectrum up to YMHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers (CCs) may include a primary component carrier (PCC) and one or more secondary component carriers (SCCs). A PCC may be referred to as a primary cell (PCell) and a SCC may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the PUSCH) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

As above, FIGS. 3A-3D depict various example aspects of structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be TDD, in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing (SCS) and symbol length/duration are a function of the numerology. The subcarrier spacing may be equal to $2^{\mu}\times15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 3A-3D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of a resource set for a multiple resource block physical uplink control channel (PUCCH) transmission in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 6-19.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method for wireless communication by a user equipment (UE), the method comprising:

receiving information indicating a physical uplink control channel (PUCCH) resource set and a number of resource blocks (RBs) parameter;

receiving downlink control information (DCI) in a physical downlink control channel (PDCCH), the DCI containing a PUCCH resource indicator (PRI);

determining a PUCCH resource from the PUCCH resource set for a PUCCH transmission, wherein the determining includes:

determining a PUCCH resource index based, at least in part, on the PRI;

determining a first lowest RB index in a first set of PUCCH symbols based, at least in part, on $$RB_{BWP}^{offset} * N_{RB} + \left\lfloor \frac{\gamma_{PUCCH}}{N_{CS}} \right\rfloor * N_{RB}$$

and a second lowest RB index in a second set of PUCCH symbols based, at least in part, on $$-RB_{BWP}^{offset} * N_{RB} - \left( \left\lfloor \frac{\gamma_{PUCCH}}{N_{CS}} \right\rfloor + 1 \right) * N_{RB}$$

when $\gamma_{PUCCH}<8$;

determining the first lowest RB index in the first set of PUCCH symbols based, at least part, on $$-RB_{BWP}^{offset} * N_{RB} - \left( \left\lfloor \frac{\gamma_{PUCCH-8}}{N_{CS}} \right\rfloor + 1 \right) * N_{RB}$$

and the second lowest RB index in the second set of PUCCH symbols based, at least in part, on $$RB_{BWP}^{offset} * N_{RB} + \left\lfloor \frac{\gamma_{PUCCH-8}}{N_{CS}} \right\rfloor * N_{RB}$$

when $\gamma_{PUCCH}\geq 8$, wherein:

the first set of PUCCH symbols comprises a first half of a number of symbols for the PUCCH transmission starting with a first symbol, the second set of PUCCH symbols comprises a second half of the number of symbols, $$RB_{BWP}^{offset}$$

is a physical resource block (PRB) offset for the PUCCH transmission, $\gamma_{PUCCH}$ is the PUCCH resource index, $N_{CS}$ is a number of cyclic shifts (CSs) in a set of cyclic shifts, $$N_{BWP}^{size}$$

is a size of a configured bandwidth part (BWP), and $N_{RB}$ is a number of RBs indicated by the number of RBs parameter; and determining an initial CS for the PUCCH transmission based, at least in part, on the PUCCH resource index and the number of RBs parameter; and transmitting the PUCCH transmission using the PUCCH resource.

2. The method of claim 1, wherein receiving the information comprises receiving a broadcast system information block (SIB) type 1 message containing:

the PUCCH resource index indicating a common resource set from a plurality of common resource sets; and the number of RBs parameter.

3. The method of claim 2, wherein the PUCCH resource index points to a row in a table mapping to a PUCCH format for the PUCCH transmission, a first symbol for the PUCCH transmission, the number of symbols for the PUCCH transmission, the PRB offset for the PUCCH transmission, and the set of CS indexes for the PUCCH transmission.

4. The method of claim 3, wherein determining the PUCCH resource index comprises determining $$\gamma_{PUCCH} = \left\lfloor \frac{2 * n_{CCE,0}}{N_{CCE,0}} \right\rfloor + 2 * \Delta_{PRI},$$

where $n_{CCE,0}$ is an index of a first control channel element (CCE) of the PDCCH, $N_{CCE,0}$ is a number of CCEs in a control resource set (CORESET) in which the PDCCH is detected, and $\Delta_{PRI}$ is a value of the PRI in the DCI.

5. The method of claim 3, wherein the number of RBs parameter indicates a number of RBs for a multiple RB PUCCH format 0 transmission or a multiple RB PUCCH format 1 transmission.

6. The method claim 3, further comprising:

deriving a plurality of numbers of RBs, $n_i=n_0, n_1, \ldots, n_{k-1}$ for a PUCCH format 0 transmission or a PUCCH format 1 transmission, wherein the plurality of numbers of RBs are associated with an index k, wherein k is from 0 to K-1, where $$K = \left\lceil \frac{8}{N_{CS}} \right\rceil,$$

wherein $N_{CS}$ is the number of CSs in the set of cyclic shifts, and wherein the deriving is based on the number of RBs parameter and a size of a system bandwidth.

7. The method of claim 3, wherein the number of RBs parameter indicated in the information indicates a plurality of numbers of RBs, $n_i=n_0, n_1, \ldots, n_{K-1}$ for a PUCCH format 0 transmission or a PUCCH format 1 transmission, and wherein the plurality of numbers of RBs are associated with an index k, where k is from 0 to K-1, where $$K = \left\lceil \frac{8}{N_{CS}} \right\rceil,$$

and where $N_{CS}$ is a number of CSs in the set of initial CS indexes.

8. The method of claim 7, further comprising:

determining a value of the index k based on the PUCCH resource index and of CSs in the set of CS indexes; and determining a number of RBs to use for the PUCCH transmission, $n_k$, based on the value of the index k.

9. The method of claim 7, wherein determining the value of the index k comprises:

determining $$k=\left\lfloor\frac{\gamma_{PUCCH}}{N_{CS}}\right\rfloor$$

when $\gamma_{PUCCH}<8$; and determining $$k=\left\lfloor\frac{\gamma_{PUCCH}-8}{N_{CS}}\right\rfloor$$

when $\gamma_{PUCCH}>8$, where $\gamma_{PUCCH}$ is the PUCCH resource index.

10. The method of claim 8, further comprising determining an RB offset parameter based on the index k.

11. The method of claim 10, wherein determining the RB offset parameter comprises determining $$RB_{offset,k}=\sum_{0}^{k-1}n_i.$$

12. The method of claim 10, wherein determining the lowest RB index is further based on a size of a configured BWP.

13. The method of claim 2, further comprising determining one or more invalid PUCCH resources in the PUCCH resource set.

14. The method of claim 13, wherein determining the one or more invalid PUCCH resources comprises:

for a PUCCH resource index smaller than eight, determining PUCCH resources as invalid that occupy a RB with an index larger than the index of a center RB of a system bandwidth; and for a PUCCH resource index equal to or larger than eight, determining PUCCH resources as invalid that occupy a RB with an index smaller than the index of the center RB of the system bandwidth.

15. The method of claim 14, wherein determining the one or more invalid PUCCH resources comprises:

for a PUCCH resource index smaller than eight, determining PUCCH resources as valid; and for a PUCCH resource index equal to or larger than eight, determining PUCCH resources as invalid that have an RB occupied by the PUCCH resource having an index smaller than the index of the center RB of the system bandwidth and overlap with an occupied PUCCH resource with a PUCCH resource index smaller than eight.

16. The method of claim 2, wherein the PUCCH resource is a common PUCCH resource is used for PUCCH transmission before dedicated radio resource control (RRC) configuration.

17. The method of claim 1, further comprising determining to use the $N_{RB}$ RBs for the PUCCH transmission.

18. The method of claim 17, further comprising:

determining the initial CS as $CS_i$*, wherein $CS_i$ is an i-th CS index from the set of initial CS indexes, and wherein i is determined as $\gamma_{PUCCH}$ mod $N_{CS}$ when $\gamma_{PUCCH}<8$ and as $(\gamma_{PUCCH}-8)$ mod $N_{CS}$ when $\gamma_{PUCCH}\geq 8$.

19. The method of claim 1, wherein:

the PUCCH resource set is a dedicated PUCCH resource set;

each PUCCH resource of the dedicated PUCCH resource set includes at least a PUCCH format, a first symbol, a number of symbols, a starting PRB, and a default initial CS;

the number of RBs parameter is provided for each PUCCH resource of the dedicated PUCCH resource set; and at least some of the PUCCH resources are provided with a different value of the number of RBs parameter.

20. The method of claim 19, wherein determining the initial CS comprises determining the initial CS as the default initial CS scaled by $N_{RB}$.

21. A method for wireless communication, the method comprising:

outputting information indicating a physical uplink control channel (PUCCH) resource set and a number of resource blocks (RBs) parameter;

outputting downlink control information (DCI) containing a PUCCH resource indicator (PRI);

determining a PUCCH resource from the PUCCH resource set for a PUCCH transmission, wherein the determining includes:

determining a PUCCH resource index based, at least in part, on the PRI;

determining a first lowest RB index in a first set of PUCCH symbols based, at least in part, on $$RB_{BWP}^{offset}*N_{RB}+\left\lfloor\frac{\gamma_{PUCCH}}{N_{CS}}\right\rfloor*N_{RB}$$

and a second lowest RB index in a second set of PUCCH symbols based, at least in part, on $$-RB_{BWP}^{offset}*N_{RB}-\left(\left\lfloor\frac{\gamma_{PUCCH}}{N_{CS}}\right\rfloor+1\right)*N_{RB}$$

when $\gamma_{PUCCH}<8$;

determining the first lowest RB index in the first set of PUCCH symbols based, at least in part, on $$-RB_{BWP}^{offset}*N_{RB}-\left(\left\lfloor\frac{\gamma_{PUCCH-8}}{N_{CS}}\right\rfloor+1\right)*N_{RB}$$

and the second lowest RB index in the second set of PUCCH symbols based, at least in part, on $$RB_{BWP}^{offset}*N_{RB}+\left\lfloor\frac{\gamma_{PUCCH-8}}{N_{CS}}\right\rfloor*N_{RB}$$

when $\gamma_{PUCCH}\geq 8$, wherein:

the first set of PUCCH symbols comprises a first half of a number of symbols for the PUCCH transmission starting with a first symbol, the second set of PUCCH symbols comprises a second half of the number of symbols, $$RB_{BWP}^{offset}$$

is a physical resource block (PRB) offset for the PUCCH transmission, $\gamma_{PUCCH}$ is the PUCCH resource index, $N_{CS}$ is a number of cyclic shifts (CSs) in a set of cyclic shifts, $$N_{BWP}^{size}$$

is a size of a configured bandwidth part (BWP), and $N_{RB}$ is a number of RBs indicated by the number of RBs parameter; and determining an initial CS for the PUCCH transmission based, at least in part, on the PUCCH resource index and the number of RBs parameter; and monitoring for the PUCCH transmission using the PUCCH resource.

22. The method of claim 21, wherein the PUCCH resource index points to a row in a table mapping to a PUCCH format for the PUCCH transmission, a first symbol for the PUCCH transmission, the number of symbols for the PUCCH transmission, the PRB offset for the PUCCH transmission, and the set of CS indexes for the PUCCH transmission.

23. The method of claim 22, wherein the number of RBs parameter indicates a number of RBs for a multiple RB PUCCH format 0 transmission or a multiple RB PUCCH format 1 transmission.

24. An apparatus for wireless communication, the apparatus comprising:

one or more memories comprising computer-executable code; and one or more processors configured to execute the computer-executable code to cause the apparatus to:

receive information indicating a physical uplink control channel (PUCCH) resource set and a number of resource blocks (RBs) parameter;

receive downlink control information (DCI) in a physical downlink control channel (PDCCH), the DCI containing a PUCCH resource indicator (PRI);

determine a PUCCH resource from the PUCCH resource set for a PUCCH transmission, including to cause the apparatus to:

determine a PUCCH resource index based, at least in part, on the PRI;

determine a first lowest RB index in a first set of PUCCH symbols based, at least in part, on $$RB_{BWP}^{offset} * N_{RB} + \left\lfloor \frac{\gamma_{PUCCH}}{N_{CS}} \right\rfloor * N_{RB}$$

and a second lowest RB index in a second set of PUCCH symbols as $$-RB_{BWP}^{offset} * N_{RB} - \left( \left\lfloor \frac{\gamma_{PUCCH}}{N_{CS}} \right\rfloor + 1 \right) * N_{RB}$$

when $\gamma_{PUCCH}<8$;

determine the first lowest RB index in the first set of PUCCH symbols based, at least in part, on $$-RB_{BWP}^{offset} * N_{RB} - \left( \left\lfloor \frac{\gamma_{PUCCH-8}}{N_{CS}} \right\rfloor + 1 \right) * N_{RB}$$

and the second lowest RB index in the second set of PUCCH symbols based, at least in part, on $$RB_{BWP}^{offset} * N_{RB} + \left\lfloor \frac{\gamma_{PUCCH-8}}{N_{CS}} \right\rfloor * N_{RB}$$

when $\gamma_{PUCCH} \geq 8$, wherein:

the first set of PUCCH symbols comprises a first half of a number of symbols for the PUCCH transmission starting with a first symbol, the second set of PUCCH symbols comprises a second half of the number of symbols, $$RB_{BWP}^{offset}$$

is a physical resource block (PRB) offset for the PUCCH transmission, $\gamma_{PUCCH}$ is the PUCCH resource index, $N_{CS}$ is a number of cyclic shifts (CSs) in a set of cyclic shifts, $$N_{BWP}^{size}$$

is a size of a configured bandwidth part (BWP), and $N_{RB}$ is a number of RBs indicated by the number of RBs parameter; and determine an initial CS for the PUCCH transmission based, at least in part, on the PUCCH resource index and the number of RBs parameter; and transmit the PUCCH transmission using the PUCCH resource.

25. An apparatus for wireless communication, the apparatus comprising:

one or more memories comprising computer-executable code; and one or more processors configured to execute the computer-executable code to cause the apparatus to:

output information indicating a physical uplink control channel (PUCCH) resource set and a number of resource blocks (RBs) parameter;

output downlink control information (DCI) containing a PUCCH resource indicator (PRI);

determine a PUCCH resource from the PUCCH resource set for a PUCCH transmission, including to cause the apparatus to:

determine a PUCCH resource index based, at least in part, on the PRI;

determine a number of RBs to monitor for the PUCCH transmission;

determine a first lowest RB index in a first set of PUCCH symbols based, at least in part, on $$RB_{BWP}^{offset} * N_{RB} + \left\lfloor \frac{\gamma_{PUCCH}}{N_{CS}} \right\rfloor * N_{RB}$$

and a second lowest RB index in a second set of PUCCH symbols based, at least in part, on $$-RB_{BWP}^{offset} * N_{RB} - \left(\left\lfloor \frac{\gamma_{PUCCH}}{N_{CS}} \right\rfloor + 1\right) * N_{RB}$$

when $\gamma_{PUCCH}<8$;

determine the first lowest RB index in the first set of PUCCH symbols based, at least in part, on $$-RB_{BWP}^{offset} * N_{RB} - \left(\left\lfloor \frac{\gamma_{PUCCH-8}}{N_{CS}} \right\rfloor + 1\right) * N_{RB}$$

and the second lowest RB index in the second set of PUCCH symbols as $$RB_{BWP}^{offset} * N_{RB} + \left\lfloor \frac{\gamma_{PUCCH-8}}{N_{CS}} \right\rfloor * N_{RB}$$

when $\gamma_{PUCCH}>8$, wherein:

the first set of PUCCH symbols comprises a first half of a number of symbols for the PUCCH transmission starting with a first symbol, the second set of PUCCH symbols comprises a second half of the number of symbols, $$RB_{BWP}^{offset}$$

is a physical resource block (PRB) offset for the PUCCH transmission, $\gamma_{PUCCH}$ is the PUCCH resource index, $N_{CS}$ is a number of cyclic shifts (CSs) in a set of cyclic shifts, $$N_{BWP}^{size}$$

is a size of a configured bandwidth part (BWP), and $N_{RB}$ is a number of RBs indicated by the number of RBs parameter; and determine an initial CS for the PUCCH transmission based, at least in part, on the PUCCH resource index and the number of RBs parameter; and monitor the PUCCH transmission using the PUCCH resource.

* * * * *